United States Patent
Ninan

(10) Patent No.: US 9,710,215 B2
(45) Date of Patent: Jul. 18, 2017

(54) MAXIMIZING NATIVE CAPABILITY ACROSS MULTIPLE MONITORS

(71) Applicant: Dolby Laboratories Licensing Corporation, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 78 days.

(21) Appl. No.: 14/668,491

(22) Filed: Mar. 25, 2015

(65) Prior Publication Data

US 2015/0277840 A1    Oct. 1, 2015

Related U.S. Application Data

(60) Provisional application No. 62/040,296, filed on Aug. 21, 2014, provisional application No. 61/972,803, filed on Mar. 31, 2014.

(51) Int. Cl.
| | | |
|---|---|---|
| *G09G 5/02* | (2006.01) | |
| *H04N 1/60* | (2006.01) | |
| *H04N 5/57* | (2006.01) | |
| *H04N 9/64* | (2006.01) | |
| *G06F 3/14* | (2006.01) | |

(52) U.S. Cl.
CPC .......... *G06F 3/1423* (2013.01); *G06F 3/1438* (2013.01); *G09G 5/026* (2013.01); *G09G 2320/0285* (2013.01); *G09G 2320/0693* (2013.01); *G09G 2340/06* (2013.01); *G09G 2370/04* (2013.01)

(58) Field of Classification Search
CPC combination set(s) only.
See application file for complete search history.

(56) References Cited

U.S. PATENT DOCUMENTS 5,487,172 A * 1/1996 Hyatt .................. B60R 16/0373
700/8
6,195,086 B1 * 2/2001 Perlman .................... G09G 5/12
345/1.1

(Continued)

FOREIGN PATENT DOCUMENTS

| | | |
|---|---|---|
| JP | H10-133984 | 5/1998 |
| JP | 2005-222439 | 8/2005 |

(Continued)

OTHER PUBLICATIONS

WEB forum discussion, NEC 2690 or DELL 2709? http://www.luminous-landscape.com/forum/index.php?topic=34555.0.

*Primary Examiner* — Wesner Sajous

(57) ABSTRACT

In an embodiment, a first display monitor communicates with a second display monitor to determine a common set of display capabilities that are supported by both the first display monitor and the second display monitor. One or more first color grading instructions for one or more first images are received from a first user. In response to receiving the one or more first color grading instructions, the one or more first images are color graded with the one or more first color grading instructions to generate one or more first color graded images. The one or more first color graded images are rendered on the first display monitor. In addition, the one or more first color graded images are caused to be rendered on the second display monitor.

22 Claims, 12 Drawing Sheets

(56) References Cited

U.S. PATENT DOCUMENTS

| | | |
|---|---|---|
| 6,757,010 B2 | 6/2004 | Fasciano |
| 8,390,644 B2 | 3/2013 | Marcu |
| 2007/0097879 A1 | 5/2007 | Bleckert |
| 2011/0181565 A1 | 7/2011 | Asamura |
| 2011/0249015 A1 | 10/2011 | Lonkar |
| 2013/0207996 A1 | 8/2013 | Shibuya |
| 2014/0247375 A1* | 9/2014 | Kobayashi ............ H04N 9/735 348/223.1 |
| 2015/0070894 A1* | 3/2015 | Chuang ................ F21V 23/001 362/249.06 |

FOREIGN PATENT DOCUMENTS

| | | |
|---|---|---|
| JP | 2007-147852 | 6/2007 |
| JP | 2010-268065 | 11/2010 |
| JP | 2013-097649 | 3/2014 |
| WO | 2008/085150 | 7/2008 |

\* cited by examiner

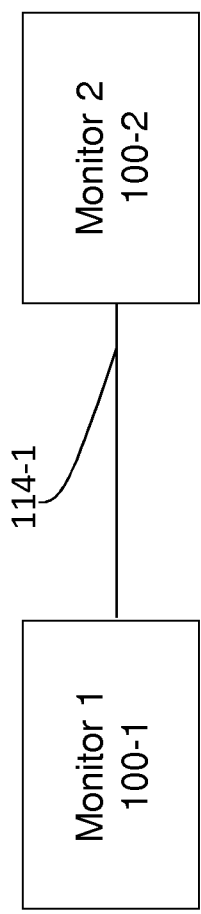

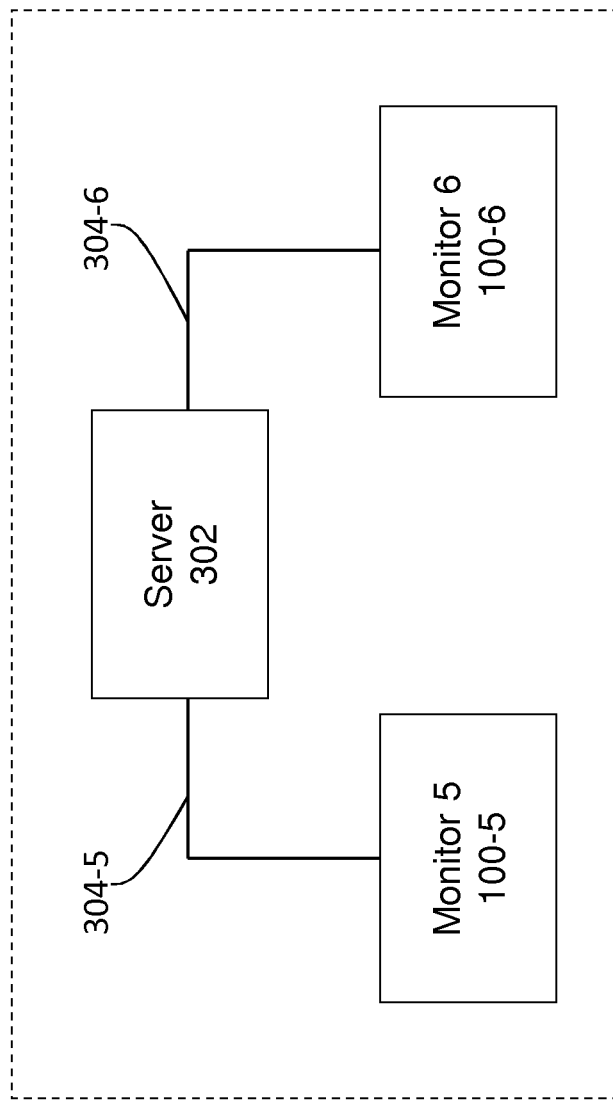

MAXIMIZING NATIVE CAPABILITY ACROSS MULTIPLE MONITORS

CROSS REFERENCE TO RELATED APPLICATIONS

This patent application may be related to U.S. Provisional Patent Application Ser. No. 61/972,803 filed Mar. 31, 2014 and U.S. Provisional Patent Application Ser. No. 62/040,296 filed Aug. 21, 2014, which is incorporated herein by reference in its entirety.

TECHNOLOGY

The present invention relates generally to display techniques, and in particular, to maximizing native capability across multiple monitors.

BACKGROUND

Different monitor manufacturers may produce monitors with different native display capabilities. Even for the same monitor manufacturer, monitors of different models and/or years, monitors of the same model and year but different batches, individual monitors produced in the same batch, etc., have varying native display capabilities. As a result, same images rendered by side-by-side monitors shows readily perceptible differences from monitor to monitor.

To resolve this issue, manufacturers typically opt to constrain their monitor products to a much narrower common-denominator color gamut and a much lower common-denominator dynamic range considered to be safely supported by most if not all monitors produced on a product line and through the life of the product line. However, physical properties and/or capabilities of components used in monitors intrinsically vary. Further, aging effects on the components unpredictably vary after the monitors have been released to end users. Consequently, in practice, it is hard to render the same image with multiple monitors in a perceptually uniform manner, whether the monitors are arranged side-by-side or located remotely from one another. In practice, performing artistic evaluation on one monitor of images color graded on a different monitor can be delicate and error-prone exercises.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A through FIG. 3C illustrate example monitors that operate in common modes.

DESCRIPTION OF EXAMPLE EMBODIMENTS

Figure 1:
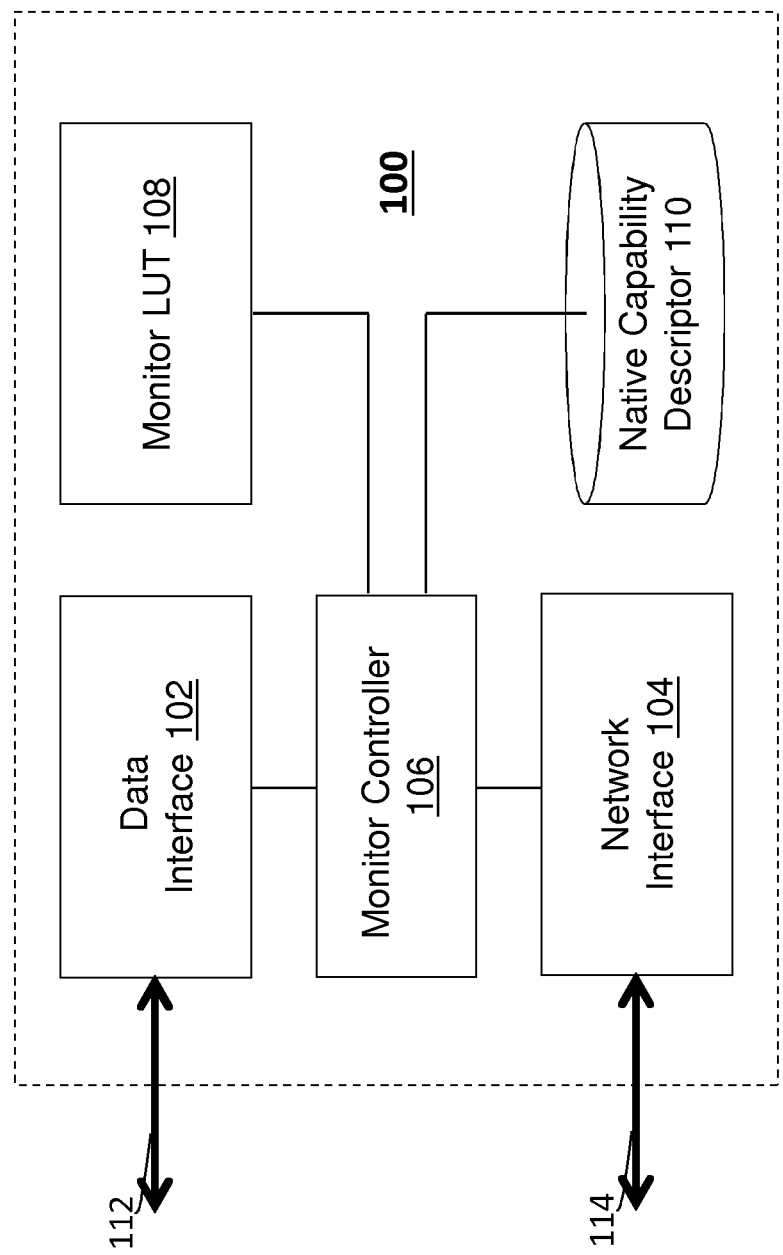
FIG. 1 illustrates an example monitor.

Example embodiments, which relate to maximizing native capability across multiple monitors, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. NATIVE DISPLAY CAPABILITIES
4. DISPLAY APPLICATIONS WITH SINGLE OR MULTIPLE MONITOR(S)
5. EXAMPLE COMMON MODE CONFIGURATIONS
6. COLLABORATIVE COLOR GRADING OPERATIONS
7. EXAMPLE PROCESS FLOWS
8. IMPLEMENTATION MECHANISMS-HARDWARE OVERVIEW
9. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, monitors are released to end users with their respective native color gamuts and native dynamic ranges. A monitor capable of supporting a wide color gamut and a high dynamic range is calibrated to that wide color gamut and that high dynamic range, without being downscaled to a much narrower color gamut and a much lower dynamic range deemed to be safely supported by a plurality of monitors including the monitor. Thus, the monitor can better represent/render a wide variety of video content, video signals, etc., as the monitor is calibrated to exploit its native display capabilities that can accurately represent colors and luminance levels. In contrast, monitors under other approaches might not accurately represent/render some colors and luminance levels beyond a much narrower common-denominator color gamut and a much lower common-denominator dynamic range to which the monitors would be calibrated.

Instead of constraining all monitors to a common minimum such as a REC. 709 color gamut and a maximum luminance of 1,000 nits, which are expected to be supported by most if not all past, present, and future monitors from a specific monitor manufacturer, a monitor under techniques as described herein is released with a (e.g., natively supported, maximum, full, standard-based, non-standard-based, etc.) color gamut and a (e.g., natively supported, maximum, full, standard-based, non-standard-based, etc.) dynamic range such as 95% of a P3 color gamut and a maximum luminance level of 2500 nits, etc., which are supported by native display capabilities of the monitor.

Different monitors may age and experience component variations differently. After a monitor under techniques as described herein is released to an end user, the monitor may be calibrated from time to time, and can continually be used maximally with time-varying native display capabilities of the monitor. For the purpose of illustration, the monitor may be calibrated at factory to 95% of a P3 color gamut and a maximum luminance level of 2000 nits. Over the time, the monitor may deteriorate to only 94% of the P3 color gamut and a maximum luminance level of 1200 nits when calibrated by the end user at a specific time. Under techniques as described herein, the monitor can still be used with the later calibrated color gamut and maximum luminance level (94% of the P3 color gamut and the maximum luminance level of 1200 nits in the present example) currently supported by the monitor.

In various display applications and/or end user use cases, a monitor under techniques as described herein provides the best possible images in terms of realizing the image rendering goals and requirements of these display applications and/or end user use cases. For example, in display applications and/or end user use cases that do not require two or more monitors to show identical images in a perceptually uniform manner, an individual monitor may utilize its full individual native display capabilities in rendering images with the best possible vivid colors and high contrasts. On the other hand, in display applications and/or end user use cases that do require two or more monitors to show identical images in a perceptually uniform manner, multiple monitors may utilize a widest wide color gamut and a highest dynamic range commonly (e.g., mutually, etc.) supported by all of the multiple monitors to render images in the perceptually uniform manner.

Thus, techniques as described herein can be used to free monitors from being constrained or downscaled to a much narrower color gamut and a much lower dynamic range in the hope that all monitors produced on the line and through the life of the product due to aging would still support the much narrower color gamut and the much lower dynamic range as common denominators for all the monitors.

In some embodiments, when two or more monitors are to be used for rendering image in a perceptually uniform manner side-by-side or remotely from one another, the monitors communicate directly or indirectly with one another about their respective native display capabilities; negotiate/determine a common mode with a color gamut, a dynamic range, a white point, etc., maximally supported by all the monitors; reconfigure themselves to operate in the common mode so that the images as rendered by all the monitors match visually in the perceptually uniform manner. In some embodiments, the native display capabilities exchanged between or among the multiple monitors may include, but are not limited to only, operational parameters to configure/control specific point spread functions of light sources in one or more of the multiple monitors, operational parameters to configure/control light compensation (e.g., to compensate differences in dynamic range, color gamut, white point, non-uniform backlight distributions—such as yellow tails, etc.—of a display monitor, etc.) specific to a side-lit display monitor, a direct-lit monitor, a quantum-dot (QD) display monitor, etc.

These monitors may communicate, and negotiate for the common mode, with one another over a communication link (e.g., Ethernet, IP network connection, Wi-Fi, Bluetooth, RF, wireless, wire-based, etc.) between or among the monitors. Additionally, optionally, or alternatively, these monitors may communicate, and negotiate for the common mode, with one another by way of one or more data storage devices such as USB devices, SD devices, etc. Additionally, optionally, or alternatively, these monitors may communicate, and negotiate for the common mode, with one another by way of one or more servers. Thus, techniques as described herein can be used to avoid or reduce manual calibrations of monitors by end users. Furthermore, these techniques can also be used to avoid preparing different image data to drive different monitors in order to render same images in a perceptually consistent manner on the monitors.

In some embodiments, the monitors can be reconfigured (e.g., on demand, in specific display applications, in specific end user use scenarios, etc.) to operate with the widest common-denominator color gamut and the highest common-denominator dynamic range supported by all the monitors in related multiple monitor display applications and/or end user use cases.

For example, if the widest common-denominator color gamut is 94% of the P3 color gamut and the maximum common-denominator luminance level is 1200 nits, then all the monitors are reconfigured to operate in a common mode with that widest common denominator color gamut and that maximum common-denominator luminance level. As a result, the monitors can match one another with a wider color gamut and a higher dynamic range than a much narrower pre-designated color gamut such as a REC. 709 color gamut and a much lower pre-designated dynamic range such as a maximum luminance level of 1,000 nits.

On the other hand, if there is a (e.g., relatively inexpensive, etc.) monitor that is made only capable of 80% of the P3 color gamut and a maximum luminance level of 600 nits, a true common mode—which is supported by all the monitors, and which has a color gamut possibly narrower than a pre-designated common-denominator color gamut (e.g., a REC. 709 color gamut, etc.) and a dynamic range possibly lower than a pre-designated common-denominator dynamic range (e.g., a maximum luminance level of 1,000 nits, etc.)—can still be found and used. Under other approaches, images would be impossible to be rendered in a perceptually uniform manner as one of the monitors could have a color gamut possibly narrower than a pre-designated common-denominator color gamut (e.g., a REC. 709 color gamut, etc.) and a dynamic range possibly lower than a pre-designated common-denominator dynamic range (e.g., a maximum luminance level of 1,000 nits, etc.).

In some embodiments, a method comprises providing a display system as described herein. In some embodiments, mechanisms as described herein form a part of a display system, including but not limited to a handheld device, tablet computer, theater system, outdoor display, game machine, television, laptop computer, netbook computer, cellular radiotelephone, electronic book reader, point of sale terminal, desktop computer, computer workstation, computer kiosk, PDA and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1 illustrates an example monitor (or display device) 100 that comprises a data interface 102, a network interface 104, a monitor controller 106, a monitor look-up table (LUT) 108, a native capability descriptor 110, etc. Additionally, optionally, or alternatively, the monitor (100) may further comprise one or more light units (e.g., backlight units, side-lit units, etc.), one or more optical stacks, one or more color filter layers, etc. Pixel structures (e.g., liquid crystal unit structures, etc.) used to modulate light transmission for image rendering purposes can be implemented in one or more of the optical stacks.

In some embodiments, the data interface (102) is configured to receive/send data through a data connection 112. Examples of the data interface (102) include, but are not limited to any of: plug-in interfaces, locally wired interfaces, serial connections, wireless interfaces, infrared interfaces, RF interfaces, USB interfaces, SD interfaces, Micro SD interfaces, flash drive interfaces, external hard drive, network storage interfaces, fiber channel interfaces, Firewire interfaces, etc. The data connection (112) may, but is not required to, be permanently tethered to, or established with, the monitor (102).

In some embodiments, the network interface (104) is configured to receive/send data through a network connection 114. Examples of the network interface (104) include, but are not limited to any of: IP network interfaces, Ethernet interfaces, Wi-Fi interfaces, etc. The network connection (114) may, but is not required to, be permanently established with the monitor (102).

The monitor controller (106) comprises specific software, hardware, combination of software and hardware, etc., configured to map individual pixel values (e.g., RGB pixel values, YCbCr pixel values, etc.) in a received image to individual voltage levels that are to be applied to the corresponding individual pixel structures. As used herein, a received image refers to an image that is received by the monitor 100 for rendering purposes. The received image may be an image among a plurality of images that are received for rendering purposes from one or more of the data interface 102, the network interface 104, a USB interface, an Ethernet interface, a HDMI interface, a SDI interface, etc., configured with the monitor (100).

In some embodiments, the monitor (100) may be calibrated one or more times by a manufacturer, a system administrator, an end user, etc. One or more calibration instruments such as colorimeter, spectrophotometer, etc., may be used to measure and calibrate native display capabilities of the monitor (100). Results of a calibration of the monitor (100) may be used to generate or update the monitor LUT (108) and the native capability descriptor (110). For example, the monitor (100) may be first calibrated at factory; results of the calibration are used to create initial factory settings (of the monitor (100)) as represented by values in the monitor LUT (108) and the native capability descriptor (110). After the monitor (100) is released or deployed to be used by end users, the monitor (100) may, or may not again, be calibrated from time to time (e.g., every six months, every year, every two year, etc.), on demand, etc. In some embodiments, the native capability descriptor (110) comprises a time indicator (e.g., a time stamp, etc.) indicating when the last calibration was performed.

In some embodiments, the monitor (100) is determined at the time of a specific calibration (e.g., at factory, after released to an end user, etc.) to possess native display capabilities that support a (e.g., relatively wide) color gamut that may or may not be standard based. Examples of the color gamut determined to be supported by the monitor (100) at the time of the specific calibration include, but are not limited to only, any of: all or a substantial portion (e.g., 102%, 100%, 98%, 97%, 96%, 95%, 94%, etc.) of a color gamut as specified in REC. 2020, all or a substantial portion (e.g., 102%, 100%, 98%, 97%, 96%, 95%, 94%, etc.) of a P3 color gamut, all or a substantial portion (e.g., 102%, 100%, 98%, 97%, 96%, 95%, 94%, etc.) of a REC. 709 color gamut, all or a substantial portion (e.g., 102%, 100%, 98%, 97%, 96%, 95%, 94%, etc.) of a color gamut specified by a proprietary specification, etc. For the purpose of illustration only, an example percentile value (e.g., 102%, 100%, 98%, 97%, 96%, 95%, 94%, etc.) of two color gamuts may be computed as ratios of a first color gamut (e.g., the full color gamut supported by the monitor (100), etc.) to a second color gamut (e.g., a REC. 2020 color gamut, etc.) in a chromaticity chart such as a CIE chart, etc.

In some embodiments, the native display capabilities determined at the time of the specific calibration support a (e.g., relatively high) dynamic range that may or may not be standard based. In some embodiments, the dynamic range can be characterized by a minimum luminance level (e.g., dark black, etc.) and a maximum luminance level (e.g., the brightest level, etc.). Examples of the maximum luminance level of the dynamic range include, but are not limited to only, any of: 80 nits, 100 nits, 120 nits, 600 nits, 1000 nits, 4000 nits, 20,000 nits, 40,000 nits, etc. Examples of the minimum luminance level of the dynamic range include, but are not limited to only, any of: 0+nits, 1 nit, 0.5 nit, 0.1 nit, 0.05 nit, 0.005 nit, etc.

In some embodiments, the native display capabilities determined at the time of the specific calibration support one or more white points that may or may not be standard based. Examples of the white points include, but are not limited to only, any of: D50, D55, D60, D65, D93, C, E, etc.

Under other approaches, a common-denominator color gamut and/or a common-denominator dynamic range, typically much narrower than the full native color gamut and/or the full native dynamic range supported by a monitor, would be selected in a calibration of monitor. A monitor LUT, or a transfer function that maps pixel values from a video signal to voltage drive values used to drive display operations of the monitor, under these other approaches would be typically configured to support the worst case scenario of a plurality of monitors produced in the same batch, in the same model-year, by the same manufacturer, etc. For example, among all the most saturated greens that could be natively supported by the plurality of monitors, the least of the most saturated greens or even a still less saturated green would be calibrated for the plurality of monitors under the other approaches, whether these monitors would be used in a single monitor use case or in a multiple monitor user case; the monitor LUT that supports no more saturated green than the least of the most saturated greens would be used to render images, whether the monitor would be used in a single monitor use case or in a multiple monitor use case.

In contrast, under techniques as described herein, a monitor such as 100 of FIG. 1 can be released to an end user with its native color gamut and native dynamic range. In some embodiments, the monitor LUT (108), or a transfer function between pixel values to voltage drive values for image rendering, can be configured to map pixel values (e.g., RGB pixel values, YCbCr pixel values, luminance values, chroma values, non-RGB primary colors, etc.) to voltage levels that generate colors, luminance levels, in reference to a white point, within the native color gamut and dynamic range supported by the native display capability of the monitor (100), with no regards to other monitors' calibrated display capabilities. The native color gamut and native dynamic range that are supported by the monitor LUT (108) as determined by the calibration of the monitor (100) can be a relatively wide color gamut and a relatively high dynamic range supported by the native display capability of the monitor (100). In a first example, the native color gamut and native dynamic range are the maximum native color gamut and the maximum native dynamic range determined to be achievable with the native display capability of the monitor (100) to the fullest possible extent. In a second example, the native color gamut and dynamic range are a color gamut and a dynamic range that maximally preserve certain colors (e.g., saturated colors, skin-tone colors, etc.) determined to be achievable with the native display capability of the monitor (100). The native color gamut and native dynamic range may be any combination of a standard-based color gamut (e.g., REC. 2020, REC. 709, P3, etc.) and a standard-based dynamic range, a standard-based color gamut and a non-standard-based dynamic range, a non-standard-based color gamut (e.g., 95% of P3, etc.) and a standard-based dynamic range, and a non-standard-based color gamut (e.g., 95% of P3, etc.) and a non-standard-based dynamic range. Additionally, optionally, or alternatively, the native color gamut and native dynamic range may or may not be scaled down to a color gamut and a dynamic range that one or more other monitors in a same batch, a same model, a same manufacturer, different ages, etc., are expected to be capable of supporting. In some embodiments, primary colors in the monitor (100) can be the most saturated primary colors (e.g., red, green, blue, etc.) natively supported by the monitor (100), without being limited to the least (or an even less than the least) of the most saturated primary colors in a plurality of monitors produced in the same batch, in the same model-year, by the same manufacturer, etc., as under the other approaches. In these embodiments, the monitor LUT (108), or a transfer function between pixel values and voltage drive values, is configured or calibrated to support the most saturated primary colors (e.g., red, green, blue, etc.) for rendering images.

When the monitor (100) is used in a single monitor application, for example, when a colorist is color grading/timing video images alone, the monitor (100) can render the video images with the native color gamut and dynamic range as determined to be supported by the monitor LUT (108). Here, video images to be color graded/timed may include, but are not limited to only, any of: scene referred video images, raw video images, input video content in a high dynamic range signal, input video content in an extended dynamic range signal, etc.

Since the monitor (100) can be calibrated to the native color gamut and native dynamic range, which are not pre-designated but rather calibrated based on determined native display capabilities of the monitor (100), the monitor (100) can display video images with fewer errors, more vivid colors (e.g., more saturated colors, etc.) and higher dynamic range (e.g., high brightness image portions, deep dark black levels, etc.) than a monitor that has been down-calibrated to a pre-designated color gamut and a pre-designated dynamic range under other approaches. Thus, the monitor (100) under techniques as described herein can be used to provide, to a colorist (or a user), a better visual feedback or comparison between a pre-color-graded version of a video image and a post-color-graded version of the same video image than a monitor calibrated under the other approaches.

3. Native Display Capabilities

In some embodiments, the monitor (100), or the monitor controller (206) therein in, is configured to generate a description of the native display capabilities from results of a monitor calibration and save the description as a native capability descriptor (110). In some embodiments, the native capability descriptor (110) includes not only parameter values defining the native color gamut (e.g., calibrated primary color values for primary colors and a calibrated white point value of the native color gamut, etc.) and native dynamic range (e.g., calibrated maximum and minimum luminance levels, etc.) to which the monitor (100) is calibrated, but also additional parameter values defining what the monitor (100) is capable of being calibrated to. In some embodiments, the native capability descriptor (110) may include, but are not limited to only, operational parameters to configure/control specific point spread functions of one or more light sources/emitters in the monitor (100), operational parameters to configure/control light compensation (e.g., to compensate differences in dynamic range, color gamut, white point, non-uniform backlight distributions—such as yellow tails, etc.—of a display monitor, etc.) specific to the monitor (100), which may be a side-lit display monitor, a direct-lit monitor, a quantum-dot (QD) display monitor, etc.

Figure 2:
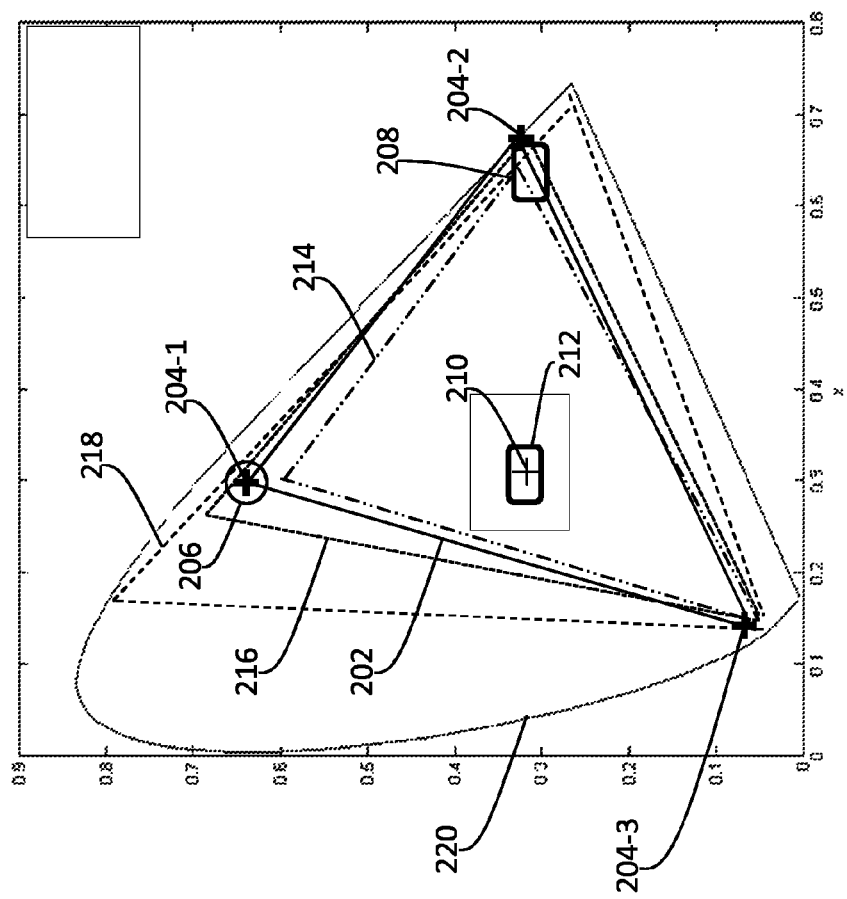
FIG. 2 illustrates an example color gamut.

FIG. 2 illustrates an example native color gamut 202 in a CIE x-y chromaticity diagram (in which the spectral locus 220 is represented as a boundary of a shark-fin shape). For the purpose of illustration only, the native color gamut (202) is supported by the monitor (100) and comprises three vertexes (e.g., 204-1 through 204-3, etc.) representing three primary colors. In some embodiments, the native color gamut (202) lies completely within a standard-based color gamut such as a REC. 709 color gamut (e.g., 214, etc.), a P3 color gamut (e.g., 216, etc.), a REC. 2020 color gamut (e.g., 218, etc.), etc. In some embodiments, the native color gamut (202) does not lie completely within, but rather overlaps with, a standard-based color gamut such as a REC. 709 color gamut (e.g., 214, etc.), a P3 color gamut (e.g., 216, etc.), a REC. 2020 color gamut (e.g., 218, etc.), etc.

In some embodiments, the monitor (100) may comprise a set of components (e.g., light source components, optical components, electronic components, mechanical components, etc.) one or more of which are controllable to realize a specific primary color (e.g., red, etc.) of the native color gamut (202) in any primary color value of a set (e.g., 208, etc.) of one or more configurable primary color values. A primary color value (e.g., a value that defines a primary color such as red, green, blue, etc.) can be, without limitation, represented by a pair of x and y values in the chromaticity diagram. For example, the monitor (100) may comprise one or more components (e.g., laser light sources, etc.) to increase the saturation of a primary color such as red, etc. As a result, the primary color (red in the present example) can be set by the monitor (100) to any value in the set (208) of configurable primary color values.

In some embodiments, the monitor (100) may comprise a set of components (e.g., light source components, optical components, electronic components, mechanical components, etc.) one or more of which are controllable to realize a white point (e.g., 210, etc.) of the native color gamut (202) in any white point value of a set (e.g., 212, etc.) of one or more configurable white point values (e.g., D50, D65, D93, E, C, etc.). In some embodiments, a white point value (e.g., a value that defines a white, etc.) can be represented by a pair of x and y values in the chromaticity diagram. For example, the monitor (100) may comprise one or more components (e.g., laser light sources, etc.) to adjust compositions of colors for the white point. As a result, the white point (210) can be set by the monitor (100) to any value in the set (212) of configurable white point values.

In some embodiments, the monitor (100) may comprise a set of components (e.g., light source components, optical components, electronic components, mechanical components, etc.) one or more of which are controllable to realize a maximum luminance level of a calibrated native dynamic range in any maximum luminance value of a set of one or more configurable maximum luminance values (e.g., 80 nits, 600 nits, 4,000 nits, 20,000 nits, etc.). For example, the monitor (100) may comprise one or more components (e.g., laser light sources, etc.) to adjust the maximum luminance level. As a result, the maximum luminance level can be set by the monitor (100) to any value in the set of configurable maximum luminance values.

In some embodiments, the monitor (100) may comprise a set of components (e.g., light source components, optical components, electronic components, mechanical components, etc.) one or more of which are controllable to realize a minimum luminance level of a calibrated native dynamic range in any minimum luminance value of a set of one or more configurable minimum luminance values (e.g., 0+nits, 1 nit, 0.5 nit, 0.1 nit, 0.05 nit, 0.005 nit, etc.). For example, the monitor (100) may comprise one or more components (e.g., local dimming, etc.) to adjust the minimum luminance level. As a result, the minimum luminance level can be set by the monitor (100) to any value in the set of configurable minimum luminance values.

Some or all of the above parameter values such as configurable primary color values, configurable white point values, configurable maximum luminance vales, configurable minimum luminance values, etc., are intrinsic to the native capabilities of the monitor (100) with no reference to other monitors. Some or all of these parameter values can be directly determined as measured values in a calibration of the monitor (100).

In a calibration of the monitor (100), multiple measurements of one or more parameter values such as primary color values, white points, luminance levels, etc., can be made. From these multiple measurements, an individual tolerance range that represents measurement errors or precision of an individual parameter value may be determined for the individual parameter value such as a primary color value, white point value, luminance level, etc. For purpose of illustration only, a specific primary color value for a green primary color of the calibrated native color gamut (202), as represented by the vertex (204-1) of FIG. 2, may have a tolerance range 206.

In some embodiments, some or all of parameter values that define the calibrated color gamut, the calibrated dynamic range, the calibrated white point, etc., are automatically determined in a calibration of the monitor (100) without user input (other than initiating the calibration). In some embodiments, some or all of parameter values that define the calibrated color gamut, the calibrated dynamic range, the calibrated white point, etc., are determined in a calibration of the monitor (100) based at least in part on user input (e.g., other than or in addition to initiating the calibration, etc.). For example, the monitor (100) may be additionally, optionally, or alternatively, configured to accept user input (e.g., received from an end user after providing the user with visual inspection of test images, computer-generated or -processed images, raw images, etc., with the monitor (100) temporarily set to a candidate color gamut, a candidate dynamic range, a candidate white point, etc.) that selects specific primary color values to form a calibrated color gamut (e.g., 202, etc.) that maximally include certain colors or color regions (e.g., skin tone colors, saturated colors, etc.) in the CIE chart.

In some embodiments, the native capability descriptor (110) includes some or all of configurable parameter values as described herein, parameter values defining the calibrated color gamut, the calibrated dynamic range, the calibrated white point, etc. As noted, in some embodiments, the native capability descriptor (110) may include, but are not limited to only, operational parameters to configure/control specific point spread functions of one or more light sources/emitters in the monitor (100), operational parameters to configure/control light compensation (e.g., to compensate differences in dynamic range, color gamut, white point, non-uniform backlight distributions—such as yellow tails, etc.—of a display monitor, etc.) specific to the monitor (100), which may be a side-lit display monitor, a direct-lit monitor, a quantum-dot (QD) display monitor, etc.

4. Display Applications with Single or Multiple Monitor(s)

Under techniques as described herein, individual monitors (e.g., 100 of FIG. 1, etc.) are calibrated to their respective (e.g., different, etc.) color gamuts, dynamic ranges, etc., and can be used in display application and/or end user use cases in their individual capacity in a manner that maximize the respective individual native capabilities of the individual monitors. As a result, each of these monitors can express colors and luminance levels perceptually realistically to the extent supported by its respective native display capability, when rendering images received in any of a wide variety of input video signals (e.g., HDR signals, EDR signals, SDR signals, perceptually quantized video signals, etc.), input video content, etc.

In some embodiments, multiple monitors can be reconfigured (e.g., on demand, in specific display applications, in specific end user use scenarios, etc.) to support a common mode in which the monitors render same images in a perceptually uniform manner. In some end user use cases, two or more monitors may be used by one or more users (e.g., colorists, directors, other professionals/artists, etc.) to view the rendering of the same images (e.g., pre-graded images, post-graded images, etc.). In an example, a user may want to use the multiple monitors to check out the visual qualities of the images across different monitors. In another example, a colorist may perform color grading/timing operations of images with one monitor while a director may visually inspect/observe/provide feedbacks on the color grading/timing operations with another monitor. In some embodiments, at least two monitors of the multiple monitors may be located side-by-side with each other. In some embodiments, at least two monitors of the multiple monitors may be located remotely with each other.

If the multiple monitors are allowed to use their respective calibrated native display capabilities (e.g., calibrated color gamut, calibrated dynamic range, calibrated white point, etc.), at least some of the same images to be rendered by the multiple monitors may be rendered perceptually differently from monitor to monitor. Some of the colors, luminance levels, etc., represented in received input video content can be clipped in some monitors but not the others. For example, some colors that are out-of-gamut in a first monitor of the monitors may be in-gamut in a second different monitor of the monitors. Conversely, some other colors that in-gamut in the first monitor may be out-of-gamut in the second monitor.

Techniques as described herein can be used to reconfigure two or more monitors (e.g., 100 of FIG. 1, etc.) in display applications and/or end-user use scenarios so that the monitors can operate in the common mode with the same color gamut, dynamic range, white point, etc. In some embodiments, when operating in the common mode, the monitors render perceptually uniformly the same images, whether these monitors are located side-by-side with one another, remotely from one another, etc. Instead of relying on a color gamut, a dynamic range, a white point, etc., that are pre-designated, forecast, etc., techniques as described herein can be used to determine the color gamut, dynamic range, white point, etc., of the common mode based on native display capabilities of the monitors that are exchanged among the monitors. As a result, the color gamut, dynamic range, white point, etc., of the common mode as described herein are not only more accurate, but also maximize more fully to the native display capability of the monitors as a whole, than any pre-designated color gamut, dynamic range, white point, etc., under other approaches.

5. Example Common Mode Configurations

FIG. 3A illustrates an example scenario in which two or more monitors (e.g., 100-1, 100-2, etc.)—operatively linked with one or more network connections 114-1—negotiate for, and are subsequently reconfigured to operate in, a common mode with the same color gamut, the same dynamic range, the same white point, etc. For the purpose of illustration only, two monitors (100-1 and 100-2) are depicted in FIG. 3A. However, in various embodiments, more than two monitors can be reconfigured under techniques as described herein to operate in a common mode.

In some embodiments, at least two of the monitors (100-1 and 100-2) may be located side-by-side with each other. In some embodiments, at least two monitors of the monitors (100-1 and 100-2) may be located remotely with each other. In some embodiments, at least one of the monitors (100-1 and 100-2) comprises a configuration of the monitor (100) of FIG. 1. In some embodiments, the monitors (100-1 and 100-2) comprise a first native capability descriptor (e.g., a first instance of 100 of FIG. 1, etc.) and a second native capability descriptor (e.g., a second different instance of 100 of FIG. 1, etc.) respectively. The native capability descriptors may include one or more of parameter values defining respective native color gamuts and native dynamic ranges to which the monitors (100-1 and 100-2) are calibrated, additional parameter values defining what each of the monitors (100-1 and 100-2) is respectively capable of being calibrated to. In some embodiments, the native capability descriptors may include operational parameters to configure/control specific point spread functions of one or more light sources/emitters in the respective monitors, operational parameters to configure/control light compensation (e.g., to compensate differences in dynamic range, color gamut, white point, non-uniform backlight distributions—such as yellow tails, etc.—of a display monitor, etc.) specific to the respective monitors, one or more of which may be a side-lit display monitor, a direct-lit monitor, a quantum-dot (QD) display monitor, etc.

In some embodiments, the network connections (114-1) of FIG. 3 comprise the network connection (114) as illustrated in FIG. 1. In some embodiments, at least one of the network connections (114-1) is established permanently. In some embodiments, at least one of the network connections (114-1) is established temporarily (e.g., while running a specific display application, while supporting a specific end user use case, while being set to operate in the common mode, etc.). Through the network connections (114-1), one or more of the monitors (100-1 and 100-2) can be configured to receive native capability descriptors of others of the monitors (100-1 and 100-2) and/or to send/forward native capability descriptors to the others of the monitors (100-1 and 100-2).

In some embodiments, the monitor (100-1) can comprise software, hardware, a combination of software and hardware, etc., configured to receive the second native capability descriptor from the monitor (100-2) and any other native capability descriptors from any other monitors if existing in the same display application and/or end user use case; based on the first native capability descriptor with the monitor (100-1), the second native capability descriptor received from the monitor (100-2), and any other native capability descriptors from any other monitors, determine a common mode with a (e.g., maximized, standard-based, non-standard-based, etc.) color gamut, a (e.g., maximized, standard-based, non-standard-based, etc.) dynamic range, a (e.g., maximized, standard-based, non-standard-based, etc.) white point, etc., that are commonly (e.g., mutually, etc.) supported by all of the monitors (100-1 and 100-2) in the same display application and/or end user use case; etc.

In some embodiments, each of the monitors (100-1 and 100-2) is configured to perform the foregoing operations as illustrated with the monitor (100-1), for example in a peer-to-peer model. In some embodiments, at least one of the monitors (100-1 and 100-2) is configured to perform the foregoing operations as illustrated with the monitor (100-1) and signal the common mode with corresponding parameter values to at least one other monitor in the same display application and/or end user use case, for example in a master-slave model.

Once the common mode is determined and/or communicated to the multiple monitors in the same display application and/or end user use case, all of the multiple monitors, which include but are not limited to only, any of the monitors (e.g., 100-1, 100-2, etc.), can be set or reconfigured to operate in the common mode.

In a non-limiting example, the first native capability descriptor (e.g., generated in a calibration of the monitor (100-1) three months ago at factory, etc.) indicates that the monitor (100-1) has native display capability up to 95% of a P3 color gamut, a dynamic range of 0.005 nit to 20,000 nits, one or more white point values, etc., whereas the second native capability descriptor (e.g., generated in a calibration of the monitor (100-2) one month ago by an end user, etc.) indicates that the monitor (100-2) has native display capability up to 94% of a P3 color gamut, and a dynamic range of 0.05 nit to 4,000 nits. The monitor (100-1) and the monitor (100-2) can be released and/or used with their respective native color gamuts and native dynamic ranges as determined in their respective calibrations.

In the present example, when the monitors (100-1 and 100-2) are used in a specific display application and/or end user use case that requires the monitors (100-1 and 100-2) to render perceptually uniformly the same images, the monitors (100-1 and 100-2) can communicate with each other or receive their counterparts' display capability information through native capability descriptors; determine, based on the native capability descriptors, a common mode with a color gamut that is 94% of a P3 color gamut, a dynamic range that is between 0.05 nit and 4,000 nits, a specific white point (e.g., D65, etc.), etc., that are supported by the monitors (100-1 and 100-2); set to operate in the common mode for the specific display application and/or end user use case.

On the other hand, when the monitors (100-1 and 100-2) are used in a specific display application and/or end user use case that does not require the monitors (100-1 and 100-2) to render perceptually uniformly the same images, the monitor (100-1) or the monitor (100-2) can operate with a calibrated native color gamut, a calibrated dynamic range, a white point, etc. For example, the monitor (100-1) can operate with 95% of a P3 color gamut, the dynamic range of 0.005 nit to 20,000 nits, a specific white point (e.g., D65, etc.), etc., that are individually calibrated for the monitor (100-1). Independently, the monitor (100-2) can operate with 94% of a P3 color gamut, the dynamic range of 0.05 nit to 4,000 nits, a specific white point (e.g., D65, etc.), etc., that are individually calibrated for the monitor (100-2).

In some embodiments, parameter values from different monitors can be obtained from calibrations of different times. At the negotiation time for the common mode, the native capability descriptors communicated by the multiple monitors carry data items indicating how recent their respective native display capabilities were determined (e.g., in the calibrations, etc.). Different lengths of times in determining the respective native display capabilities can be taken into consideration in determining specific parameter values for the common mode. In some embodiments, parameter values of native display capabilities that are relatively recently determined can be given with (e.g., estimated, forecast, etc.) relatively high precisions or small tolerance ranges (or variances), whereas parameter values of native display capabilities that are relatively time-wise distantly determined can be given with (e.g., estimated, forecast, etc.) relatively low precisions or large tolerance ranges. Other ways of taking into account different lengths of times in determining parameter values of native display capabilities can also be used in various embodiments.

In some embodiments, parameter values from multiple monitors (e.g., possibly with different ages, different aging effects, different display applications, different use histories, etc.) can carry different precisions or tolerance ranges. For example, a primary color value for a red primary color for a first monitor may carry a first precision or tolerance range, while a primary color value for the red primary color for a second monitor may carry a different precision or tolerance range. At the negotiation time for the common mode, the native capability descriptors communicated by the multiple monitors carry data items indicating these different precisions and tolerance ranges. These different precisions and tolerance ranges can be taken into consideration in determining specific parameter values for the common mode. In some embodiments, the worst case parameter values—e.g., the least saturated primary color value within the precision or tolerance range of primary color values of a primary color, etc.—of native display capabilities can be selected as a part of the common mode. In some embodiments, the parameter values of native display capabilities with the highest likelihoods/probabilities within their respective precisions or tolerance ranges can be selected as a part of the common mode. Other ways of selecting parameter values of native display capabilities within their respective precisions or tolerance ranges can also be used in various embodiments. In some embodiments, the native display capabilities exchanged between or among the multiple monitors may include, but are not limited to only, operational parameters to configure/control specific point spread functions of light sources in one or more of the multiple monitors, operational parameters to configure/control light compensation (e.g., to compensate differences in dynamic range, color gamut, white point, non-uniform backlight distributions—such as yellow tails, etc.—of a display monitor, etc.) specific to a side-lit display monitor, a direct-lit monitor, a quantum-dot (QD) display monitor, etc. In some embodiments, one or more of the multiple monitors can be configured to determine and/or select values for these operational parameters for the purpose of rendering same images perceptually consistently in their display operations.

In some embodiments, when multiple monitors (e.g., 100 of FIG. 1, 100-1 and 100-2 of FIG. 3, etc.) communicate native capability descriptors and negotiate a common mode, one or more of the multiple monitors are configured to accept user input from one or more users. For example, primary color values (e.g., x-y values of a red primary color, x-y values of a green primary color, x-y values of a blue primary color, etc.) programmatically determined to be commonly (e.g., mutually, etc.) supported by the multiple monitors can be rendered on the multiple monitors. The users can visually inspect results of the rendering of the primary color values of different primary colors, provide the user input to make individual adjustments to the primary color values on individual primary colors of individual monitors of the multiple monitors, if deemed necessary by the users. In some embodiments, at least one individual monitor of the multiple monitors operate in the common mode, with a programmatically determined color gamut (e.g., as defined by programmatically determined primary color values, etc.), a programmatically determined dynamic range, a programmatically determined white point, etc., with individual adjustments made by the users.

Figure 3B:
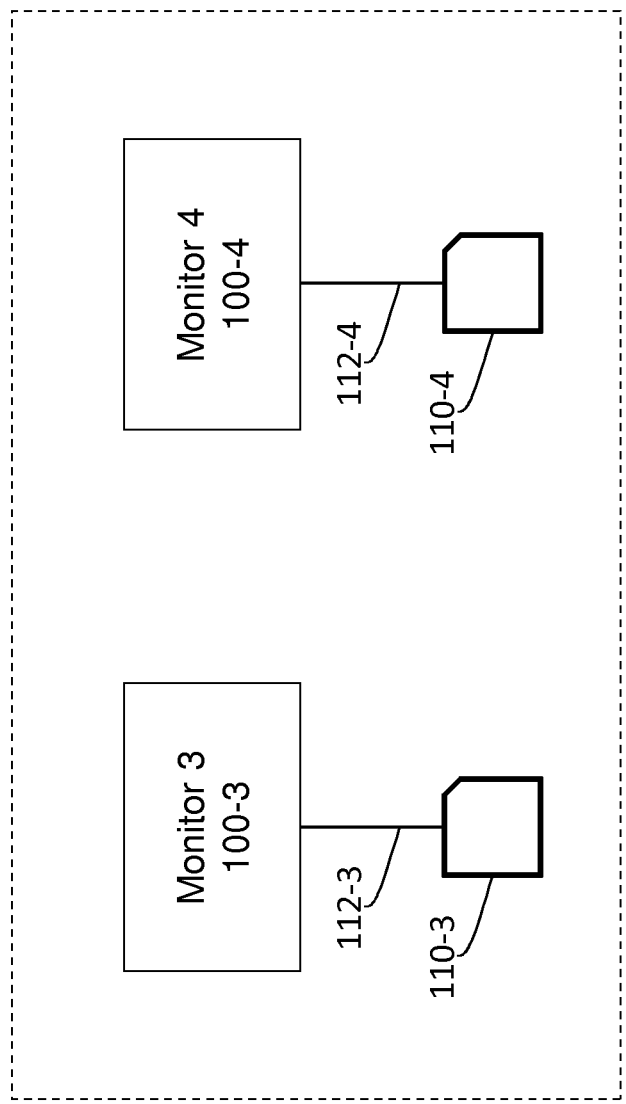

FIG. 3B illustrates an example scenario in which two or more monitors (e.g., 100-3, 100-4, etc.)—which may be, but are not required to be, operatively linked with one or more network connections such as 114-1 of FIG. 3B, etc.—negotiate for, and are subsequently reconfigured to operate in, a common mode with the same color gamut, the same dynamic range, the same white point, etc.

In some embodiments, the monitors (100-3 and 100-4) comprise a third native capability descriptor (e.g., a third instance of 100 of FIG. 1, etc.) and a fourth native capability descriptor (e.g., a fourth instance of 100 of FIG. 1, etc.) respectively. The native capability descriptors may include one or more of parameter values defining respective native color gamuts and native dynamic ranges to which the monitors (e.g., 100-3, 100-4, etc) are calibrated, additional parameter values defining what each of the monitors (e.g., 100-3, 100-4, etc.) is respectively capable of being calibrated to.

In some embodiments, each of the monitors (e.g., 100-3, 100-4, etc.) comprises a data interface (e.g., 112-3, 112-4, etc.) configured to read/write native capability descriptor(s) (e.g., 110-3, 110-4, etc.). In some embodiments, the native capability descriptor(s) (e.g., 110-3, 110-4, etc.) can be stored on one or more storage devices (e.g., USB drives, SD drives, etc.). Through the data interfaces (e.g., 112-3, 112-4, etc.), one or more of the monitors (e.g., 100-3, 100-4, etc.) can be configured to receive native capability descriptors of others of the monitors (e.g., 100-3, 100-4, etc.); to send/forward native capability descriptors to the others of the monitors (e.g., 100-3, 100-4, etc.); based on the native capability descriptors resident on the one or more of the monitors (e.g., 100-3, 100-4, etc.) and/or received from the others of the monitors (e.g., 100-3, 100-4, etc.), to determine a common mode with a (e.g., maximized, standard-based, non-standard-based, etc.) color gamut, a (e.g., maximized, standard-based, non-standard-based, etc.) dynamic range, a (e.g., maximized, standard-based, non-standard-based, etc.) white point, etc., that are commonly (e.g., mutually, etc.)

supported by all of the monitors (e.g., 100-3, 100-4, etc.) in the same display application and/or end user use case; etc.

In some embodiments, each of the monitors (e.g., 100-3, 100-4, etc.) is configured to perform the foregoing operations. In some embodiments, at least one of the monitors (e.g., 100-3, 100-4, etc.) is configured to perform the foregoing operations and write a descriptor (e.g., a file, one or more data items, etc.) defining the common mode with corresponding parameter values into a storage device (e.g., a USB device, a SD device, etc.); etc. The descriptor defining the common mode can be read from the storage device by at least one other monitor in the same display application and/or end user use case.

Once the common mode is determined and/or communicated (e.g., via one or more data devices, etc.) to the multiple monitors in the same display application and/or end user use case, all of the multiple monitors, which include but are not limited to only, any of the monitors (e.g., 100-3, 100-4, etc.), can be set or reconfigured to operate in the common mode.

FIG. 3C illustrates an example scenario in which two or more monitors (e.g., 100-5, 100-6, etc.) negotiate by way of a server 302 for, and are subsequently reconfigured to operate in, a common mode with the same color gamut, the same dynamic range, the same white point, etc.

In some embodiments, the monitors (100-5 and 100-6) comprise a fifth native capability descriptor (e.g., a fifth instance of 100 of FIG. 1, etc.) and a sixth native capability descriptor (e.g., a sixth instance of 100 of FIG. 1, etc.) respectively. The native capability descriptors may include one or more of parameter values defining respective native color gamuts and native dynamic ranges to which the monitors (e.g., 100-5, 100-6, etc.) are calibrated, additional parameter values defining what each of the monitors (e.g., 100-5, 100-6, etc.) is respectively capable of being calibrated to.

In some embodiments, one or more of the monitors (e.g., 100-5, 100-6, etc.) comprises one or more server connection (e.g., 304-5, 304-6, etc.) to the server (302). Examples of the server connections may include, but are not limited to only, any of: data connections, data storage devices that can be accessed by one or more devices as described herein, Ethernet links, IP network links, Wi-Fi links, HDMI links, a side channel over a cable connection, network and/or data links implemented with one or more of a wide variety of data access protocols, network access protocols, etc. The one or more of the monitors (e.g., 100-5, 100-6, etc.) are configured to provide (e.g., send via one or more network links one or more respective native capability descriptors to the server (302) over the server connections (304-5, 304-6, etc.); receive a descriptor (e.g., a file, one or more data items, etc.) defining a common mode with corresponding parameter values from the server (302) over the server connections (e.g., 304-5, 304-6, etc.); etc. The server (302) can be configured to receive the native capability descriptors of the one or more of the monitors (e.g., 100-5, 100-6, etc.) from the one or more of the monitors (e.g., 100-5, 100-6, etc.); based on the native capability descriptors from the one or more of the monitors (e.g., 100-5, 100-6, etc.), to determine the common mode with a (e.g., maximized, standard-based, non-standard-based, etc.) color gamut, a (e.g., maximized, standard-based, non-standard-based, etc.) dynamic range, a (e.g., maximized, standard-based, non-standard-based, etc.) white point, etc., that are commonly (e.g., mutually, etc.) supported by all of the monitors (e.g., 100-5, 100-6, etc.) in the same display application and/or end user use case; to send the descriptor (e.g., a file, one or more data items, etc.) defining the common mode with the corresponding parameter values to the one or more of the monitors (e.g., 100-5, 100-6, etc.) over the server connections (e.g., 304-5, 304-6, etc.); etc.

Once the common mode is determined and/or communicated (e.g., via one or more data devices, etc.) to the multiple monitors in the same display application and/or end user use case, all of the multiple monitors, which include but are not limited to only, any of the monitors (e.g., 100-5, 100-6, etc.), can be set or reconfigured to operate in the common mode.

It should be noted that the scenarios illustrated in FIG. 3A, FIG. 3B, and FIG. 3C, are not mutually exclusive. In some embodiments, one or more of these illustrated scenarios can exist in a single display application and/or end user use case. For example, some of monitors in the single display application and/or end user use case can negotiate a common mode with some other of the monitors directly over network links, by way of one or more servers such as 302 of FIG. 3C, via writing/reading relative to data storage devices, etc.

Techniques as described herein can be implemented by a variety of computing devices. Examples of these computing devices may include, but are not limited to, any of dual modulation display devices, multi-layer modulation display devices, display devices with global backlight, display devices with local dimming capabilities, etc.

6. Collaborative Color Grading Operations

Two or more monitors (e.g., 100-1, 100-2, etc.) can be used in a wide variety of system configurations to support (e.g., collaborative, collective, etc.) color grading operations with a common set of display capability negotiated between the two or more monitors.

For example, two or more users may work collaboratively in conjunction with multiple monitors in any of a wide variety of system configurations to color grade one or more input images in a production version, master copy, original version, etc., into one or more color graded images that are suitable for image rendering in a particular type of viewing environment (e.g., home theater, professional movie theater, a computer display, an HDMI display, a REC. 709 monitor, a P3 monitor, a monitor capable of standard or non-standard dynamic range and color gamut, etc.).

The monitors can exchange their respective sets of display capabilities over one or more network connections between the monitors (e.g., a network connection between monitor 1 and monitor 2, etc.). For example, chromaticity values of primary colors, maximum and minimum luminance levels, white points, etc., can be exchanged among the monitors through one or more network connections. In some embodiments, with little or no user input, the monitors (e.g., automatically, etc.) communicate and negotiate to support a common set of display capabilities to be used for color grading operations. With little or no user input, a number of adjustments can be made by each of the monitors in order to support the common set of display capabilities. Examples of these adjustments include but are not limited to only, any of: each of monitor-specific adjustments for one or more specific primary colors, luminance levels, white points, etc.; monitor-specific gamma expansion or compression factors relative to one or more specific range of luminance levels; monitor-specific mappings between perceptual quantized (PQ) code words received in a PQ encoded video signal to device-specific drive values; monitor-specific adjustments to support a color gamut, a dynamic range, etc., as defined in a standard (e.g., REC. 709, P3, P5, SMPTE, etc.), a proprietary specification, etc.; specific reservations of certain code values (e.g., 16 referring to the dark black level, etc.); etc.

In some embodiments, a description defining a common set of display capabilities used by multiple users to perform collaborative color grading operations on one or more input images is saved, along with one or more color graded images generated from the color grading operations performed on the one or more input images. The description defining the common set of display capabilities can be stored in a header of a media file, as metadata of a media data bitstream, etc., that includes the one or more color graded images. Some or all of monitor-specific adjustments to support the common set of display capabilities by each of the monitors can be saved as a part of, or in addition to, the common set of display capabilities. The saved description for the common set of display capabilities and/or monitor-specific adjustments for specific monitors used in color grading operations can be replicated, distributed, transferred, delivered, transmitted, etc., with the color graded images as a part of a release, a version, etc., of a media content item, a movie, a TV show, a set of digital photographs, etc.

Figure 6A:
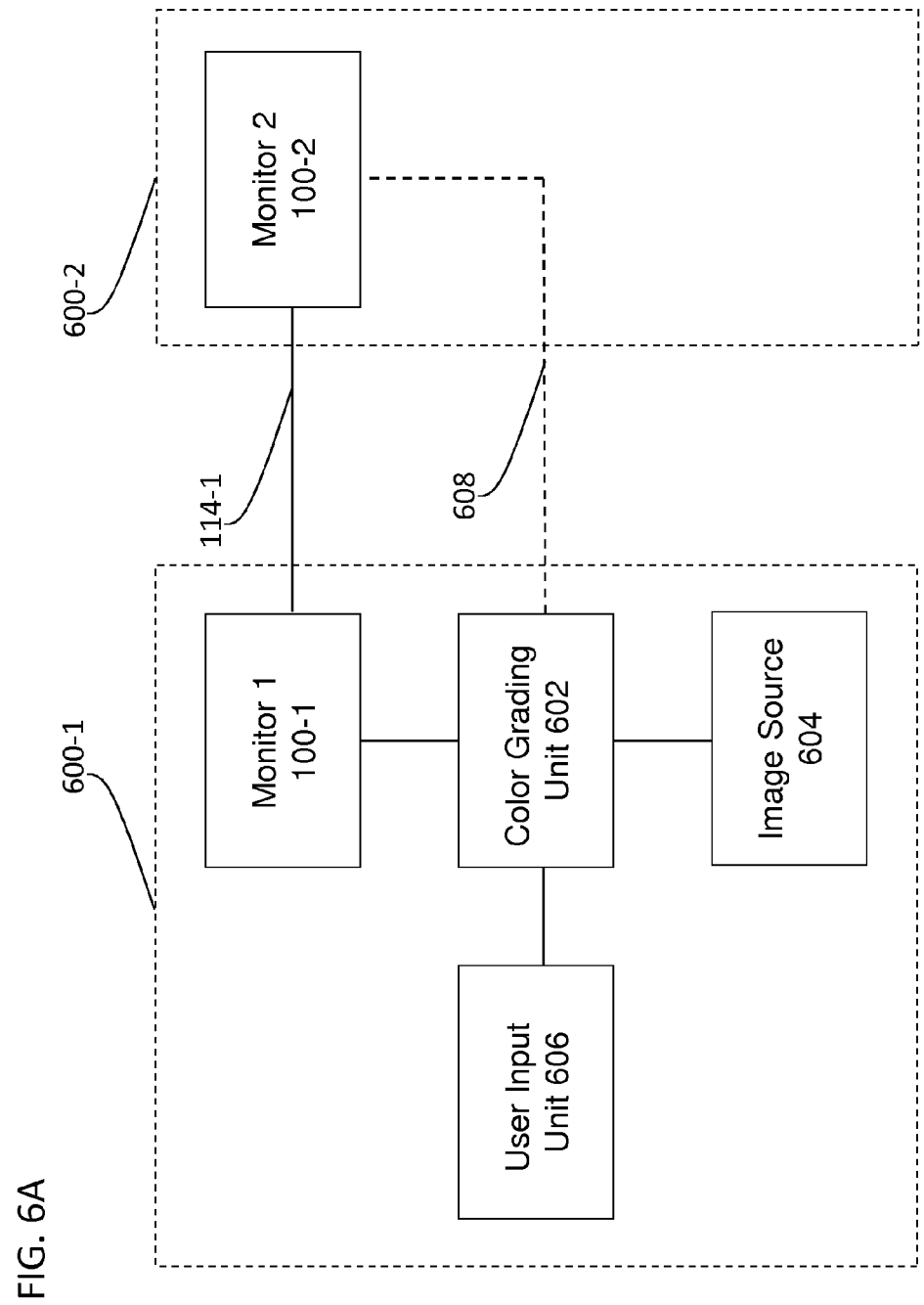
FIG. 6A through FIG. 6D illustrate example system configurations that support collaborative color grading operations.

FIG. 6A illustrates a first example configuration in which some or all of various units are operatively linked to support (e.g., collaborative, etc.) color grading operations with a common set of display capability negotiated between the two or more monitors located at one, two or more locations (e.g., a first location 600-1, a second location 600-2, etc.).

In some embodiments, an image source 604 is implemented in software, hardware, a combination of software and hardware, etc., and comprises an image data store, a multimedia content server, recording media, etc., for storing and providing the one or more input images to be color graded, etc. In some embodiments, the one or more input images may be raw images, for example, taken or captured from live scenes, etc. In some embodiments, the one or more input images may be previously color graded images, for example, for a cinema version, etc., whereas one or more output images generated with color grading operations as described herein may be further color graded images, for example, for a home theater version (e.g., to be shown properly on a high-end consumer television, etc.), etc.

In some embodiments, a color grading unit 602 is implemented in software, hardware, a combination of software and hardware, etc., configured to receive the one or more input images to be graded, and render the one or more input images on a monitor such as monitor 1 (100-1), etc. The color grading unit (602) can be further configured to receive one or more color grading instructions from a user input unit 1 (606-1); perform one or more color grading operations on the one or more input images; and render the one or more input images as color graded with the one or more color grading operations on a monitor such as monitor 1 (100-1), etc. Color grading operations as described herein may be repetitive, iterative, progressive, gradual, etc., until color graded images become (e.g., artistically, etc.) satisfactory.

In some embodiments, both the input images before being operated by a color grading operation and the input images after being operated by the color grading operation can be concurrently rendered on the same monitor. In some embodiments, both the input images before being operated by a color grading operation and the input images after being operated by the color grading operation can be separately rendered on the same monitor or on different monitors.

In some embodiments, user input unit 1 (606-1) (which may comprise a colorist surface, a control surface for color grading, a user interface, a man-machine interface, a local PC, a remote PC, a portable computing device, a mobile device, etc.) is implemented in software, hardware, a combination of software and hardware, etc.; comprises controls (e.g., knobs, pointing devices, touchpads, switches, keyboards, etc.) operable by a user; is configured to receive user input that comprises the one or more color grading instructions; provide the one or more color grading instructions to the color grading unit (602) for performing corresponding color grading operations as specified by the color grading operations; etc.

In some embodiments, some or all of (1) the one or more input images to be color graded and (2) the one or more color graded images derived from the one or more input images are rendered on the two or more monitors viewable by multiple users. For examples, some or all of the one or more input images and (2) the one or more color graded images can be sent from the color grading unit (602) to one or both of monitor 1 (100-1) and monitor 2 (100-2), directly or indirectly, via one or more of local computer connections (e.g., USB, etc.), video links, network connections (e.g., a network connection 114-1, a network connection 608, etc.), etc. In some embodiments, the color grading unit (602) sends images to monitor 1 (100-1), which can be configured or controlled to forward the images to monitor 2 (100-2) via the network connection (e.g., 114-1, etc.) between monitor 1 (100-1) and monitor 2 (100-2). In some embodiments, the color grading unit (602) sends images to monitor 2 (100-2) via the network connection (e.g., 608, etc.) between the color grading unit (602) and monitor 2 (100-2). In some embodiments, the network connection (608) comprises, or is built at least in part with, one or more monitor-to-monitor network connections (e.g., 114-1, etc.).

In some embodiments, an image as described herein (e.g., an input image to be color graded, a color graded image, etc.) is rendered on two or more monitors (e.g., monitor 1, monitor 2, etc.) in time synchronization (e.g., at the same time, etc.) with one another. In some embodiments, the two or more monitors can use one of master-slave time synchronization models, peer-to-peer time synchronization models, etc., to send, from an originating monitor (e.g., one of monitor 1 or monitor 2, etc.) to a recipient monitor (e.g., another of monitor 1 or monitor 2, etc.) the image with related time information, sequence information, frame index information, etc., that specifies when the image is to be rendered by both the originating monitor and the recipient monitor. In some embodiments, monitor 1 can be configured, selected, negotiated, etc., among the two or more monitors (e.g., monitor 1, monitor 2, etc.), as the master for time synchronization and provides time synchronization messages, instructions, information, etc., to other(s) of the two or more monitors (e.g., monitor 2, etc.) so that the two or more monitors can render the same image at the same time.

In some embodiments, a more compressed version of an image may be rendered on one of the two or more monitors, while a less compressed version of the same image may be rendered on a different one of the two or more monitors. In some embodiments, the more compressed version and the less compressed version of the same image comprise the same dynamic range (e.g., luminance-related values, etc.), color gamut, white point, etc., but are with different spatial resolutions. In some embodiments, the remote user may be operating with monitor 2 (100-2) that has a relative slow network connection; a remote user (e.g., a director at another continent, etc.) may view the image with perceptually the same color and luminance range but a different spatial resolution relative to a local user (e.g., a colorist providing color grading instructions to the color grading unit 602, etc.) of monitor 1 (100-1). An image that is sent by one monitor to one or more others of the monitors used for collaborative color grading operations may or may not be encrypted. An image may be sent between monitors using a variety of network connections including but not limited to, any of internet connections, high speed connections, wireless connections, telecommunication-based connections, wireline connections, etc.

With the system configuration as illustrated in FIG. 6A, a local user (e.g., a colorist, etc.) operating user input unit 1 (606-1) can pause an input image, provide input that specifies one or more color grading instructions, view a color graded image generated from the input image based on the one or more color grading instructions, while a remote user (e.g., a director, etc.) can view a synchronized visual progression from the input image to a final color graded image (or a compressed, down-sampled, etc., version of the color graded image) on monitor 2 (100-2) synchronized to the visual progression from the input image to the final color graded image on monitor 1 (100-1) as viewed by the local user, and provide comments (e.g., verbally, computer-enabled text, audio, video communication, instant messenger, etc.). In this configuration, the local user can add, modify or remove one or more color grading instructions through new and/or updated input made locally at the color grading unit (602) on behalf of the remote user.

Figure 6B:
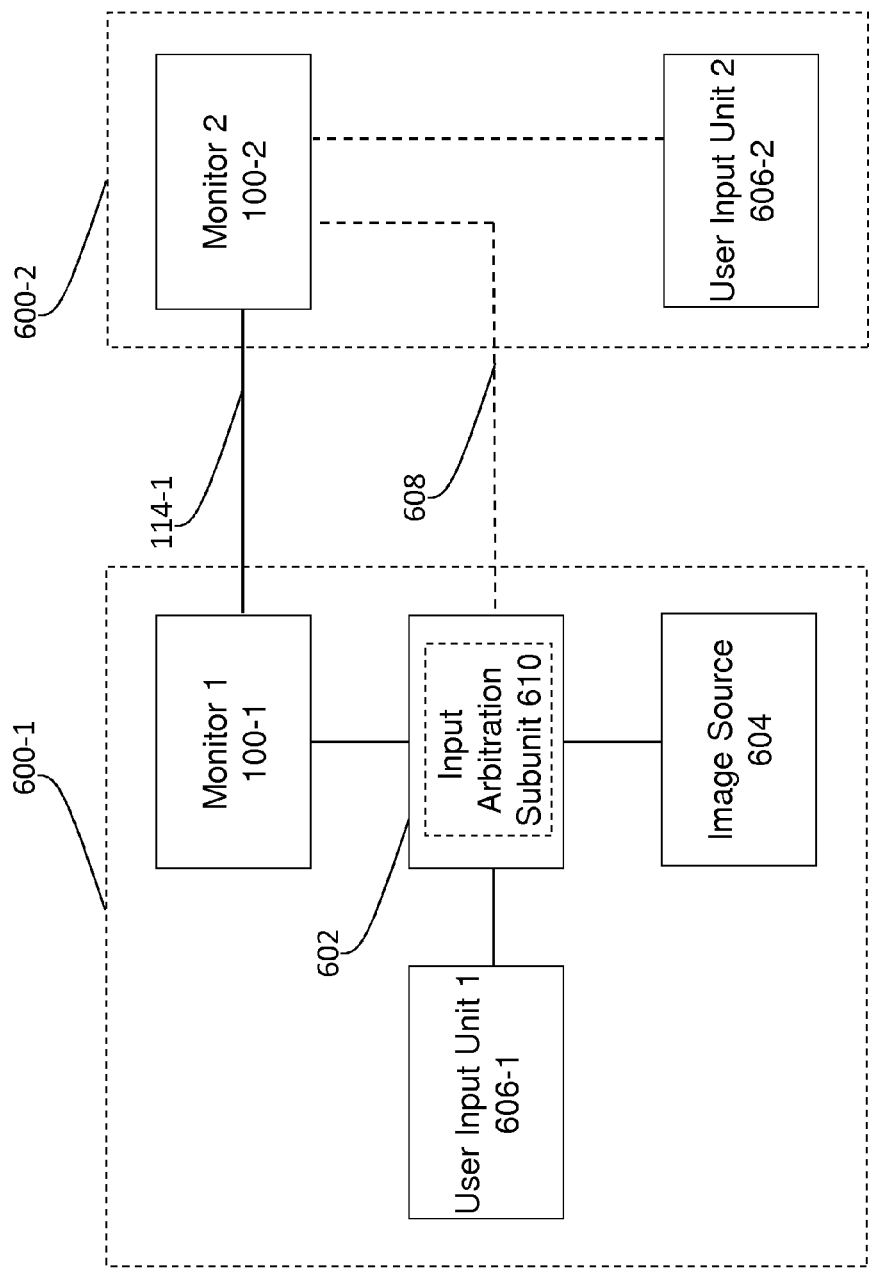

FIG. 6B illustrates a second example configuration in which some or all of various units are operatively linked to support (e.g., collaborative, etc.) color grading operations with a common set of display capability negotiated between the two or more monitors located at one, two or more locations (e.g., the first location 600-1, the second location 600-2, etc.).

In some embodiments, user input unit 2 (606-2, which may comprise a colorist surface, a control surface for color grading, a user interface, a man-machine interface, a local PC, a remote PC, a portable computing device, a mobile device, etc.) is implemented in software, hardware, a combination of software and hardware, etc.; comprises controls (e.g., knobs, pointing devices, touchpads, switches, keyboards, etc.) operable by a remote user viewing images on monitor 2 (100-2); is configured to receive user input that specifies one or more color grading instructions, and in turn provide the one or more color grading instructions to the color grading unit (602); etc. In some embodiments, user input unit 2 (606-2) can be operatively linked to monitor 2 (100-2) via a local connection (e.g., a USB connection, etc.); the one or more color grading instructions may be routed to the color grading unit (602) via monitor 2 (100-2). In some embodiments, user input units 1 and 2 (606-1 and 606-2) can be similar or even the same in terms of capabilities to generate color grading instructions based on user input. In some embodiments, user input units 1 and 2 (606-1 and 606-2) can be different in terms of capabilities to generate color grading instructions based on user input.

In some embodiments, the color grading unit (602) is further configured to receive one or more color grading instructions from a user input unit 2 (606-2); perform one or more color grading operations on the one or more input images received from the image source (604); and render the one or more input images as color graded with the one or more color grading operations on a monitor such as monitor 1 (100-1), etc. The color grading unit (602) may comprise a user input arbitration subunit 610 implemented in software, hardware, a combination of software and hardware, etc., configured to arbitrate or prioritize (e.g., based on user configurable priority rules, etc.) between local instructions specified by a local user's input to user input unit 1 (606-1) and remote instructions specified by the remote user's input to unit input unit 2 (606-2). Any of a variety of arbitration algorithms (e.g., on demand, round robin, first-in-first-out, priority-based, etc.) can be used to arbitrate between instructions from two or more user input units as described herein.

With the system configuration as illustrated in FIG. 6B, at any given time, either a local user (e.g., a colorist, etc.) operating user input unit 1 (606-1) or a remote user (e.g., a director, etc.) operating user input unit 2 (606-2) can pause an input image, provide input that specifies one or more color grading instructions, and view a color graded image generated from the input image based on the one or more color grading instructions, while other user(s) can view a synchronized progression from the input image to an intermediate or final color graded image on monitors synchronized to the progression from the input image to the intermediate or final color graded image on monitor 1 (100-1) as viewed by the local user or the remote user.

In some operational scenarios (e.g., a user at a production studio working with a director who is traveling in a different continent, etc.), network latency in one or more network connections between multiple monitors involved in color grading operations may be relatively high; it may not be possible at all times to stream images and changes to the images to all the monitors for synchronized rendering in real-time while the images are being processed or changed by one of the multiple users viewing the images and the changes to images on these monitors.

Image buffering may be used in, or incorporated by, any of a wide variety of system configurations as described herein in color grading operations.

Figure 6C:
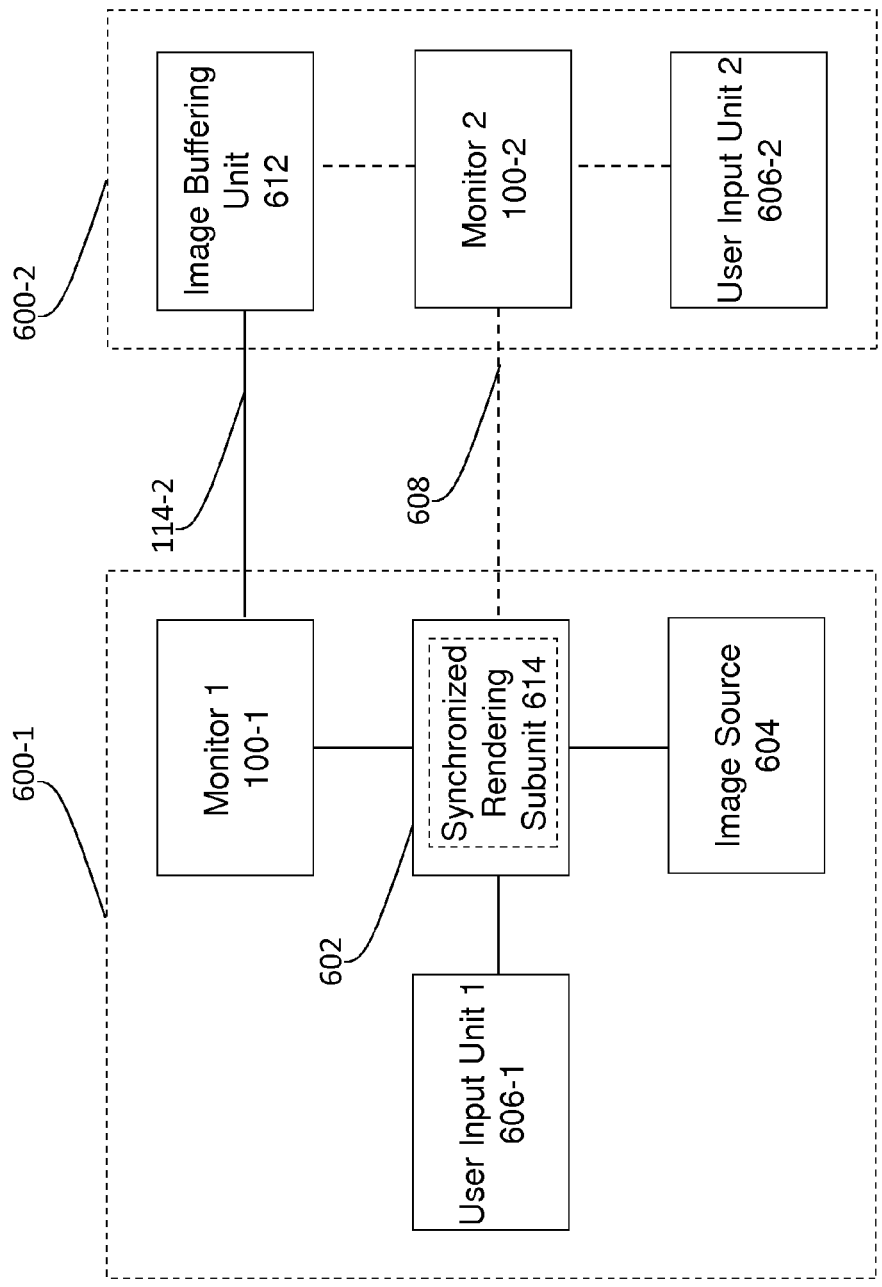

FIG. 6C illustrates a third example configuration in which the system configuration as illustrated in FIG. 6B further comprises an image buffering unit 612.

In some embodiments, the image buffering unit (612) is operatively linked with other units and is configured to receive a set of images (e.g., from a processing unit such as the color grading unit 602 at a different location from that of monitor 2, etc.) for buffering in a memory space or a data store (e.g., a micro SD device, a USB storage, etc.). The set of images buffered by the image buffering unit (602) can represent, but is not limited to only, a scene, a movie, a clip of video, etc. Additionally, optionally, or alternatively, the image buffering unit can be configured to send any of the buffered images to monitor 2 (100-2) for rendering at a particular point in time. For example, the image buffering unit (612) may receive one or more synchronized rendering instructions (e.g., rendering buffered image #6 at 5 seconds from a particular synchronization reference time, etc.) from the color grading unit (602), send an image (e.g., via a video link, a USB connection, etc.) to monitor 2 (100-2) to be rendered at the particular time at which the same image (e.g., an uncompressed version of the same image, etc.) is also rendered on monitor 1 (100-1) or other monitors involved in collaborative color grading operations. Examples of buffered images include, but are not limited to only, any of: input images to be color graded, intermediate color graded images, final color graded images, uncompressed images, compressed images, encrypted images, unencrypted images, original spatial resolution images, spatially down sampled images, etc.

In some embodiments, a processing unit (e.g., the color grading unit (602), etc.) at a location different from that of monitor 2 (100-2) can be further configured to send images for buffering to the image buffering unit (612), generate synchronized rendering instructions with a synchronized rendering subunit 614 in the color grading unit 602, and send the synchronized rendering instructions to the image buffering unit (612) for synchronized rendering of the buffered images. In some embodiments, the synchronized rendering instructions may represent a relatively small data set in relation to a supported transmission rate between monitors 1 and 1, and can be delivered with a relatively short delay as the sizes of one or more messages containing the synchronized rendering instructions are expected to be relatively small. Thus, once the buffered images are streamed, the synchronized rendering instructions, in some embodiments, can be sent on demand from one location/monitor to other location(s)/monitor(s) to cause an immediate rendering of an image that has already been buffered, to cause a fast forwarding operation, a rewinding operation, a pause, etc., in real time or substantially in real time on the monitors in different locations.

An image buffering unit as described herein may include, but is not limited to only, any of: a computing device such as a PC, a laptop, a server, etc.; a storage device such as a USB drive, a network storage device, etc.; an internal memory of a monitor (e.g., monitor 2, etc.); etc. Capacity for buffering images may vary among these possible image buffering devices.

Other users that are viewing the rendering of the buffered images may provide their feedbacks, comments, directives, etc., to a user that perform color grading operations, for example, using telecommunication devices, mobile communication devices, computing devices, instant messaging devices, etc. In some embodiments, roles can be changed. For example, a first user may operate on a clip of images and send the clip of images for buffering and/or synchronized rendering at other locations. A second user (e.g., a location at which monitor 2 is located, etc.) at one of the other locations may take over the task for color grading, generate and send additional color grading instructions via a user input unit (e.g., 606-2, etc.), perform additional or new color grading operations, send the modified images to other locations for buffering and/or synchronized rendering, etc. Any of a variety of arbitration algorithms (e.g., on demand, round robin, first-in-first-out, priority-based, etc.) can be used to arbitrate between successive color grading operations based on synchronized rendering of buffered images as described herein.

For the purpose of illustration, it has been described that a color grading unit can be at a first location in which monitor 1 is located, that color grading feedbacks, messages, instructions, etc., can be generated by users of multiple monitors and sent to the color grading unit for color grading images, etc. However, it should be noted that more than one location can have some or all of different types of devices, units, subunits, etc., deployed at a first location with monitor 1.

Figure 6D:
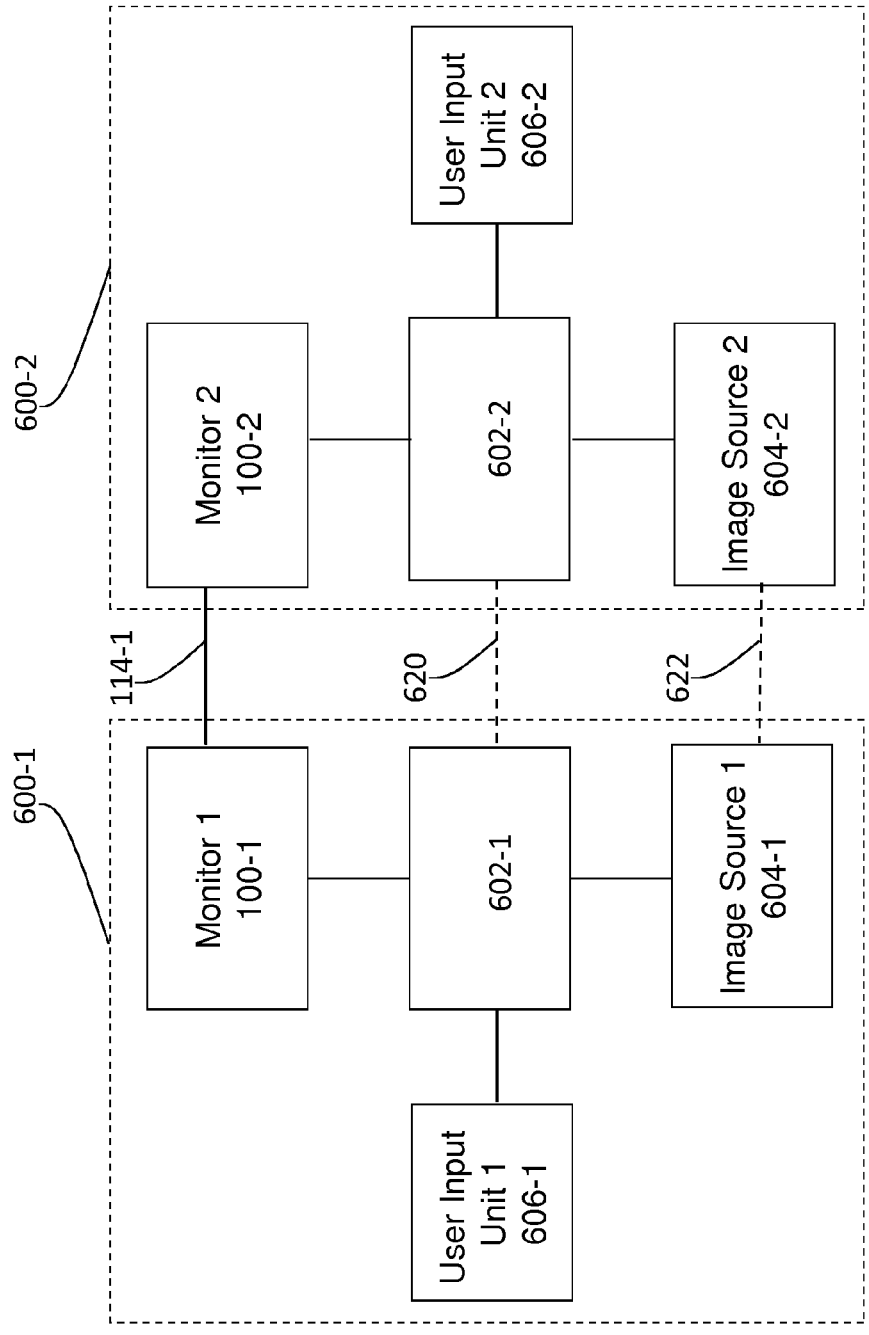

As illustrated in FIG. 6D, some or all of different types of devices, units, subunits, etc., deployed at a first location with monitor 1 can also be deployed at another location such as the second location with monitor 2. In an example embodiment, some or all of images at the first location (e.g., in an image source 1 604-1, etc.) can be replicated at the second location (e.g., in an image source 2 604-2, etc.) by communicating/sending images through one or more network connections 622 (which may be implemented through the one or more network connections 114-1 between monitor 1 and monitor 2). Similarly, the same or different color grading instructions can be processed independently, cooperatively, etc., by two or more color grading units (e.g., 602-1, 602-2, etc.) in a system configuration (e.g., as shown in FIG. 6D, etc.). Different users can provide color grading instructions to their respective color grading units (e.g., 602-1, 602-2, etc.) via two or more user input units (e.g., 606-1, 606-2, etc.). Some or all of these instructions can be shared (e.g., sent, received, etc.) by multiple color grading units, for example, through one or more network connections 620 (which may be implemented through the one or more network connections 114-1 between monitor 1 and monitor 2).

Processing units as described herein can be operatively linked, connected, etc., either locally (e.g., via a local area network, a local USB connection, etc.) or remotely (e.g., via internet, a wide area network, a remote connection, etc.). One or more of a wide variety of computer-to-computer communication mechanisms can be used. For example, some or all of processing units such as monitors, color grading units, user input units, image sources, etc., can be individually addressable by other processing units in message communications. In some embodiments, some or all of network connections, operative links, etc., can be dynamically established. For example, one of the processing units such as monitor 1 (100-1) can be a DHCP server configured to support establishing network connections on demand. In some embodiments, some or all of network connections, operative links, etc., can be wireless or wireline based. In an example embodiments, one or more (e.g., physical, logical etc.) network connections can be established between two monitors; other non-monitor processing units can connect to the monitors through video links, side channels on monitors, USB ports, etc.; communicate with other processing units through one or more of the network connections between the monitors, the video links, the side channels, the USB ports, etc. In some embodiments, a plurality of processing units in a system configuration as described herein can establish a full mesh of operative links among individual processing units in the plurality of processing units to enable any processing unit (e.g., a color grading unit) to communicate any other processing unit (e.g., a monitor, an image buffering unit, a user input unit, an image source, etc.).

7. Example Process Flows

Figure 4:
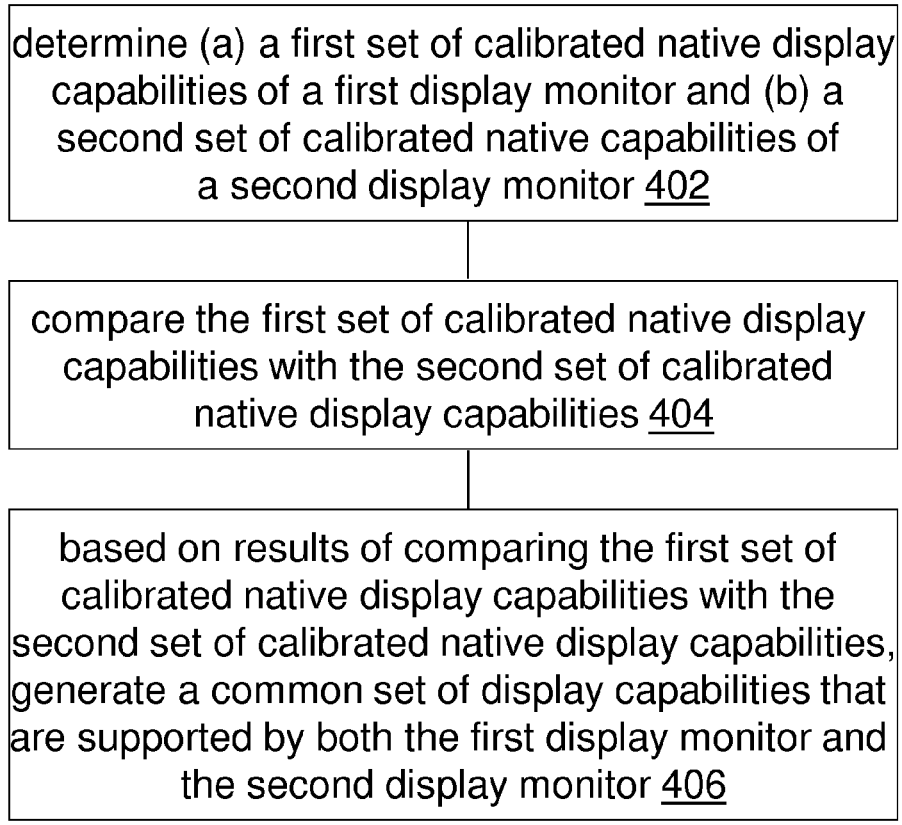
FIG. 4 and FIG. 7 illustrate example process flows.

FIG. 4 illustrates an example process flow. In some embodiments, this process flow is performed through one or more computing devices or units. In block 402, a common-mode determination module (e.g., a server such as 302 of FIG. 3C, a monitor controller such as 106 of FIG. 1, a monitor such as 100 of FIG. 1, 100-1 through 100-6 of FIG. 3A, FIG. 3B, and FIG. 3C, etc.) determines (a) a first set of calibrated native display capabilities of a first display monitor, (b) a second set of calibrated native capabilities of a second display monitor, etc. Both the first display monitor and the second display monitor may be used to display each image in a set of one or more images.

In block 404, the common-mode determination module compares the first set of calibrated native display capabilities with the second set of calibrated native display capabilities.

In block 406, based on results of comparing the first set of calibrated native display capabilities with the second set of calibrated native display capabilities, the common-mode determination module generates a common set of display capabilities that are supported by both the first display monitor and the second display monitor.

In an embodiment, the common set of display capabilities includes a color gamut that is as large as any color gamut mutually supported by the first display monitor and the second display monitor.

In an embodiment, the common set of display capabilities includes a luminance level that is as high as any luminance level mutually supported by the first display monitor and the second display monitor.

In an embodiment, the common set of display capabilities includes a luminance level that is as low as any luminance level mutually supported by the first display monitor and the second display monitor.

In an embodiment, the common set of display capabilities includes a white point mutually supported by the first display monitor and the second display monitor. The white point can be one of D50, D55, D60, D65, D93, etc.

In an embodiment, the second set of calibrated native capabilities is determined by the first display monitor based on one or more of messages sent over a network link from the second display monitor, messages sent over a network link from a companion device of the second display monitor, information provided by a server system other than the first display monitor and the second display monitor, information received from a locally connected data store, information received from a companion device of the first display monitor, etc.

In an embodiment, the first set of calibrated native display capabilities and the second set of calibrated native display capabilities comprise one or more of calibrated native display capabilities obtained at factory, calibrated native display capabilities obtained by an end user of the first display monitor or the second display monitor, etc.

In an embodiment, the first set of calibrated native display capabilities includes a first calibrated native display capability of a specific type; the second set of calibrated native display capabilities includes a second calibrated native display capability of the same specific type; the common set of display capabilities comprises a display capability of the specific type as one of the first calibrated native display capability or the second calibrated native display capability.

In an embodiment, the first set of calibrated native display capabilities includes a first calibrated native display capability of a specific type with a first tolerance range of values; the second set of calibrated native display capabilities includes a second calibrated native display capability of the same specific type with a second tolerance range of values; the common set of display capabilities comprises a display capability of the specific type having a value within either the first tolerance range of values in relation to the first calibrated native display capability or the second tolerance range of values in relation to the second calibrated native display capability.

In an embodiment, the steps of determining (402), comparing (404), and generating (406) of FIG. 4 are performed by only one of the first display monitor or the second display monitor.

In an embodiment, the steps of determining (402), comparing (404), and generating (406) of FIG. 4 are performed by each of the first display monitor or the second display monitor.

In an embodiment, the steps of determining (402), comparing (404), and generating (406) of FIG. 4 are performed by one or more devices other than the first display monitor or the second display monitor.

In an embodiment, the common set of display capabilities are supported by a plurality of display monitors that comprises the first display monitor and the second display monitor.

In an embodiment, the first set of calibrated native display capabilities includes a non-standard based color gamut.

In an embodiment, both the first display monitor and the second display monitor are configured to render one or more images with the common set of display capabilities.

In an embodiment, the first display monitor alone is configured to render one or more images with the first set of calibrated native display capabilities.

Figure 7:
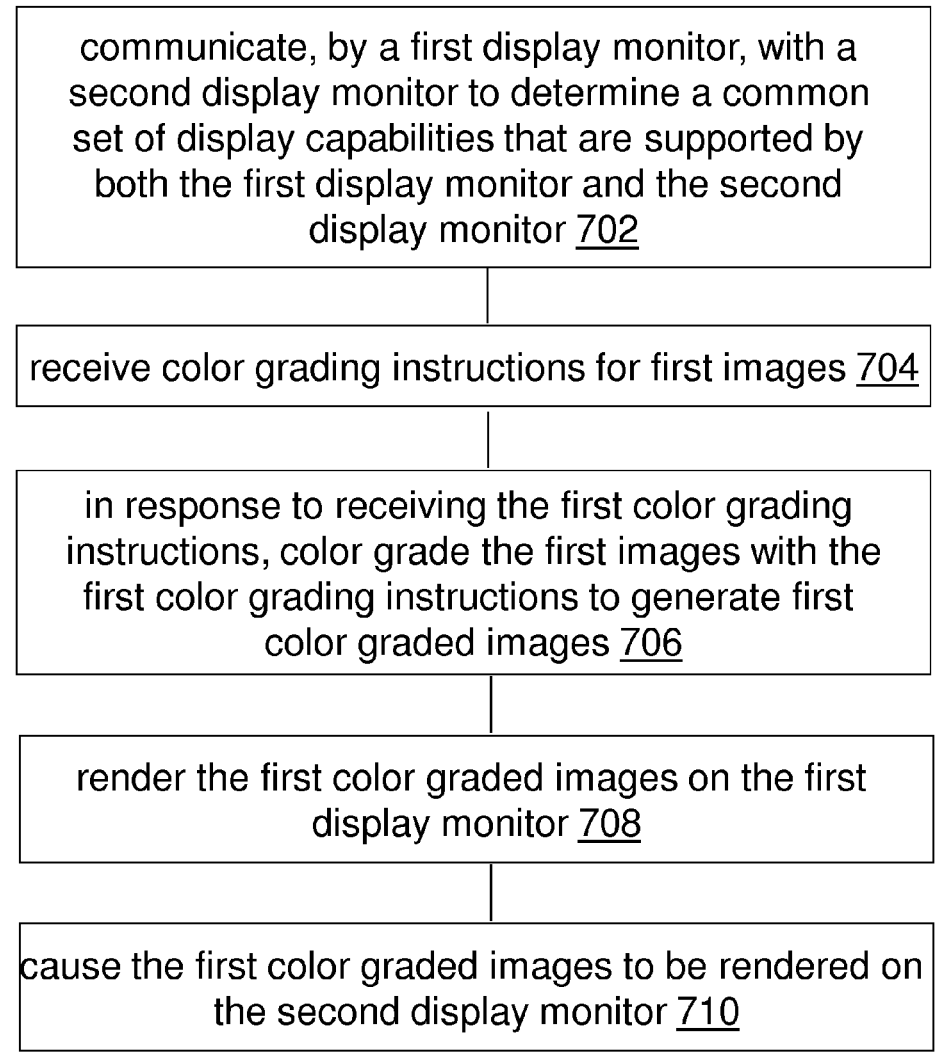

FIG. 7 illustrates an example process flow. In some embodiments, this process flow is performed through one or more computing devices or units. In block 702, a color grading system at a first location (e.g., monitor 1 of FIG. 6A through FIG. 6D, monitor 2 of FIG. 6A through FIG. 6D, etc.) communicates, by a first display monitor, with a second display monitor (e.g., at a second location, etc.) to determine a common set of display capabilities that are supported by both the first display monitor and the second display monitor.

In block 704, the color grading system receives, from a first user, one or more first color grading instructions for one or more first images.

In block 706, the color grading system, in response to receiving the one or more first color grading instructions, color grades the one or more first images with the one or more first color grading instructions to generate one or more first color graded images.

In block 708, the color grading system renders the one or more first color graded images on the first display monitor.

In block 710, the color grading system causes the one or more first color graded images to be rendered on the second display monitor.

In an embodiment, the common set of display capabilities are supported by one or more display monitors other than the first display monitor and the second display monitor; further comprising rendering the one or more first color graded images on each of the one or more display monitors.

In an embodiment, the color grading system is further configured to send the one or more first color graded images to the second display monitor for rendering.

In an embodiment, the color grading system is further configured to send a compressed version of the one or more first color graded images to the second display monitor for rendering.

In an embodiment, the color grading system is further configured to send a down-sampled version of the one or more first color graded images to the second display monitor for rendering.

In an embodiment, the color grading system is further configured to perform: sending one or more images from the first display monitor to the second display monitor to be rendered on the second display monitor; receiving, from one of the second display monitor or a companion device to the second display monitor, one or more second color grading instructions for the one or more images; in response to receiving the one or more second color grading instructions, performing: color grading the one or more images with the one or more second color grading instructions to generate one or more second color graded images, and rendering the one or more second color graded images on the first display monitor. In an embodiment, the one or more images are either (a) one or more second input images or (b) the one or more first color graded images. In an embodiment, the one or more images are buffered in one or more of data stores locally accessible to the second display monitor. In an embodiment, the one or more second color grading instructions are received from a second user viewing the one or more images as rendered on the second display monitor.

In an embodiment, the one or more first color graded images are sent to the second display monitor for buffering; the color grading system is further configured to perform: sending one or more first synchronized rendering instructions to the second display monitor; and synchronizing rendering the one or more first color graded images on the first display monitor with rendering the one or more first color graded images on the second display monitor.

In an embodiment, a display device is configured to perform any of the foregoing methods.

In an embodiment, one or more devices such as a color grading device, a user input device, a monitor, etc., are configured to perform any of the foregoing methods.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

8. Implementation Mechanisms-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
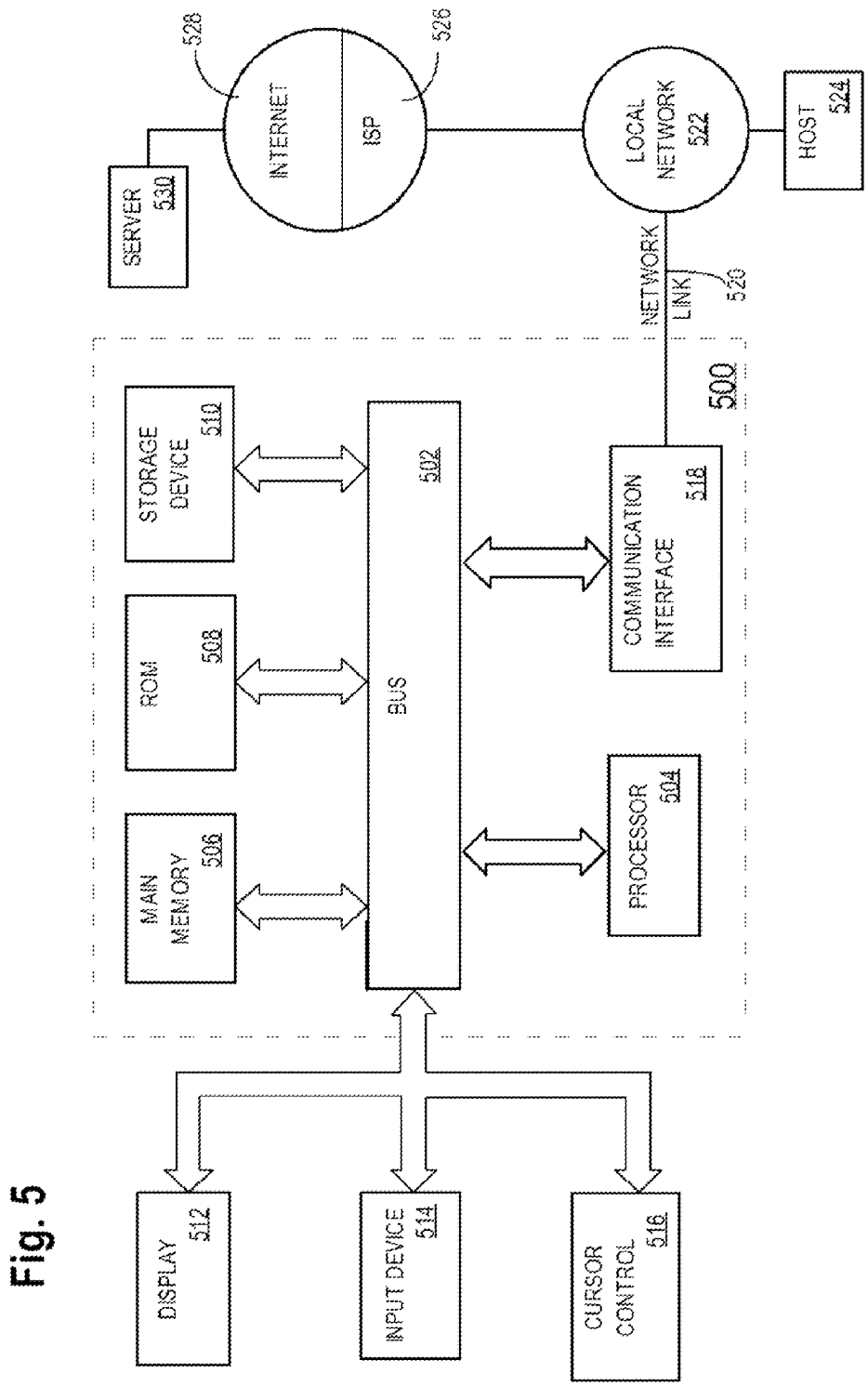
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Equivalents, Extensions, Alternatives And Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   establishing one or more network links between a first display monitor and a second monitor;
   communicating, by the first display monitor via the one or more network links, with the second display monitor to determine a common set of display capabilities that are supported by both the first display monitor and the second display monitor;
   wherein each of the first display monitor and the second display monitor is calibrated to exploit its native display capabilities with its respective native color gamut and native dynamic range instead of being calibrated to common-denominator display capabilities with a narrower common-denominator color gamut and a lower common-denominator dynamic range;
   receiving, from a first user, one or more first color grading instructions for one or more first images;
   in response to receiving the one or more first color grading instructions, performing:
      color grading the one or more first images with the one or more first color grading instructions to generate one or more first color graded images;
      rendering the one or more first color graded images on the first display monitor; and
      causing the one or more first color graded images to be rendered on the second display monitor.

2. The method as recited in claim 1, wherein the common set of display capabilities are supported by one or more display monitors other than the first display monitor and the second display monitor; further comprising rendering the one or more first color graded images on each of the one or more display monitors.

3. The method as recited in claim 1, further comprising sending the one or more first color graded images to the second display monitor for rendering.

4. The method as recited in claim 1, further comprising sending a compressed version of the one or more first color graded images to the second display monitor for rendering.

5. The method as recited in claim 1, further comprising sending a down-sampled version of the one or more first color graded images to the second display monitor for rendering.

6. The method as recited in claim 1, further comprising:
   sending one or more images from the first display monitor to the second display monitor to be rendered on the second display monitor;
   receiving, from one of the second display monitor or a companion device to the second display monitor, one or more second color grading instructions for the one or more images;
   in response to receiving the one or more second color grading instructions, performing:
      color grading the one or more images with the one or more second color grading instructions to generate one or more second color graded images;
      rendering the one or more second color graded images on the first display monitor.

7. The method as recited in claim 6, wherein the one or more images are either (a) one or more second input images or (b) the one or more first color graded images.

8. The method as recited in claim 6, wherein the one or more images are buffered in one or more of data stores locally accessible to the second display monitor.

9. The method as recited in claim 6, wherein the one or more second color grading instructions are received from a second user viewing the one or more images as rendered on the second display monitor.

10. The method as recited in claim 1, wherein the one or more first color graded images are sent to the second display monitor for buffering; and further comprising:
   sending one or more first synchronized rendering instructions to the second display monitor;
   synchronizing rendering the one or more first color graded images on the first display monitor with rendering the one or more first color graded images on the second display monitor.

11. The method as recited in claim 1, wherein the common set of display capabilities includes a color gamut that is as large as any color gamut commonly supported by the first display monitor and the second display monitor.

12. The method as recited in claim 1, wherein the common set of display capabilities includes a luminance level that is as high as any luminance level commonly supported by the first display monitor and the second display monitor.

13. The method as recited in claim 1, wherein the common set of display capabilities includes a luminance level that is as low as any luminance level commonly supported by the first display monitor and the second display monitor.

14. The method as recited in claim 1, wherein the common set of display capabilities includes a white point commonly supported by the first display monitor and the second display monitor.

15. The method as recited in claim 14, wherein the white point is one of D50, D55, D60, D65, or D93.

16. The method as recited in claim 1, wherein a second set of calibrated native capabilities of the second display monitor is determined by the first display monitor based on one or more of messages sent over a network link from the second display monitor, messages sent over a network link from a companion device of the second display monitor, information provided by a server system other than the first display monitor and the second display monitor, information received from a locally connected data store, or information received from a companion device of the first display monitor.

17. A display device configured to perform the method as recited in claim 1.

18. A color grading device configured to perform the method as recited in claim 1.

19. An apparatus comprising a processor and configured to perform the method as recited in claim 1.

20. A non-transitory computer readable storage medium, storing software instructions, which when executed by one or more processors cause performance of the method as recited in claim 1.

21. A computing device comprising one or more processors and one or more storage media storing a set of instructions which, when executed by the one or more processors, cause performance of the method as recited in claim 1.

22. The method as recited in claim 1, wherein a first set of calibrated native display capabilities of the first display monitor and a second set of calibrated native display capabilities of the second display monitor comprise one or more of calibrated native display capabilities obtained at factory, or calibrated native display capabilities obtained by an end user of the first display monitor or the second display monitor.

* * * * *